(12) United States Patent  (10) Patent No.: US 7,406,834 B2
Williams  (45) Date of Patent: Aug. 5, 2008

(54) SELF-CONTAINED MOBILE WALK-IN COOLER

(76) Inventor: Dwight Williams, 42 Patricia Ter., Grayson, GA (US) 30017

( * ) Notice: Subject to any disclaimer, the term of this patent is extended or adjusted under 35 U.S.C. 154(b) by 315 days.

(21) Appl. No.: 11/255,756

(22) Filed: Oct. 22, 2005

(65) Prior Publication Data

US 2006/0137373 A1 Jun. 29, 2006

Related U.S. Application Data

(60) Provisional application No. 60/639,116, filed on Dec. 27, 2004.

(51) Int. Cl.
*B60H 1/32* (2006.01)
(52) U.S. Cl. .............. 62/115; 62/236; 62/239; 62/323.1
(58) Field of Classification Search .......... 62/236, 62/239, 323.1
See application file for complete search history.

(56) References Cited

U.S. PATENT DOCUMENTS

| 3,545,222 | A | * | 12/1970 | Petranek | 62/236 |
|---|---|---|---|---|---|
| 3,604,218 | A | | 9/1971 | Cresti | |
| 3,692,100 | A | | 9/1972 | Gallagher, Jr. | |
| 3,792,595 | A | | 2/1974 | Willis | |
| 3,961,925 | A | | 6/1976 | Rhoad | |
| 4,932,677 | A | | 6/1990 | Shustack | |
| 4,956,978 | A | * | 9/1990 | Bleck et al. | 62/239 |
| 5,031,690 | A | * | 7/1991 | Anderson et al. | 165/43 |
| 5,123,257 | A | * | 6/1992 | Anderson et al. | 62/236 |
| 5,249,438 | A | | 10/1993 | Rhaney | |
| 5,355,694 | A | | 10/1994 | Morrow et al. | |
| 5,388,424 | A | * | 2/1995 | Chopko et al. | 62/239 |
| 5,584,188 | A | * | 12/1996 | Tippmann et al. | 62/239 |
| 5,727,352 | A | | 3/1998 | Bared | |
| 5,787,719 | A | * | 8/1998 | Wilson | 62/236 |
| 6,012,384 | A | | 1/2000 | Badalament | |
| 6,032,474 | A | * | 3/2000 | Dale et al. | 62/239 |
| 6,289,684 | B1 | * | 9/2001 | Guidry et al. | 62/229 |
| 6,502,656 | B2 | | 1/2003 | Weiss | |
| 6,929,061 | B2 | | 8/2005 | Lajeunesse | |
| 2006/0048532 | A1 | * | 3/2006 | Beal | 62/239 |

* cited by examiner

*Primary Examiner*—William E Tapolcai
(74) *Attorney, Agent, or Firm*—George Ronald Reardon

(57) ABSTRACT

A self-contained mobile walk-in cooler is disclosed. The self-contained mobile walk-in cooler is comprised of a refrigeration unit, a gasoline generator to provide power to the refrigeration unit when a permanent power source is unavailable, and a mobile carriage for quick and easy transport. The self-contained mobile walk-in cooler provides mobile and walk-in refrigeration and cooling with an easily transportable mobile carriage system.

14 Claims, 25 Drawing Sheets

SELF-CONTAINED MOBILE WALK-IN COOLER

CLAIM TO PRIORITY

Applicant hereby claims priority under all rights to which he is entitled under the benefit under 35 USC 119(e) based upon the U.S. Provisional Application Ser. No. 60/639,116 for this patent application filed at the United States Patent and Trademark Office on Dec. 27, 2004.

FIELD OF THE INVENTION

The present invention relates to the field of mobile cooling devices. In particular, the present invention relates to a self-contained mobile walk-in cooler that is comprised of a commercial refrigeration unit, a gasoline generator to provide power to the refrigeration unit when a permanent power source is unavailable, and a mobile carriage for quick and easy transport.

BACKGROUND OF THE INVENTION

There are many patents in existence that claim to be a "mobile cooler." Several patents in the prior art use the words mobile cooler to refer to camping coolers or picnic coolers that are portable or mobile. The myriad of these patents often disclose what is essentially a family picnic cooler enhanced with wheels, handles, tracks, rollers, drive assemblies, or the like. Such inventions do not disclose the use of a larger, mobile refrigeration cooler nor do they disclose the use of an accompanying gasoline generator as an alternative power source.

Other patents in the prior art use the term mobile cooler to refer to a large stationary walk-in cooler used for refrigeration. Such a refrigeration cooler is technically mobile, but only because it can be moved with the aid of a lifting machine. Such a device, although movable, is not easily and readily transportable. For example, coolers manufactured by U.S. Cooler, see http://www.uscooler.com, are walk-in, and are transportable to a location for use, but they are not mobile in the sense that they are on a mobile carriage to be pulled as a trailer behind a vehicle. Neither are they ready for quick and immediate use upon delivery.

Still other patents in the prior art also use the term mobile cooler to refer to a large commercial refrigeration unit for the transportation of perishables, essentially a refrigerated semi-trailer. Such devices, although useful for their intended purposes, do not provide a walk-in cooler, but rather disclose very large transportation units for moving perishables. Additionally, these devices further need a commercial trucking system driver to transport the trailers from place to place.

Many of the refrigeration units in existence are powered by either electricity or by diesel engine power. A need exists for a mobile cooler that can operate independent of any need for an electrical source or a diesel power source.

These and other problems exist. Previous attempts to solve these and other problems include the following.

U.S. Pat. No. 5,355,694, issued to Morrow et al. on Oct. 18, 1994, discloses a container cooled by air from a vehicle air conditioning system and especially adapted for use in a commercial van utilized for the delivery of perishable foods over considerable distances.

U.S. Pat. No. 3,692,100, issued to Gallagher, Jr. on Sep. 19, 1972, discloses a mobile refrigerator shipping container unit adapted for both land and sea shipment has both air-cooled and water-cooled condensers in the refrigeration system with connections which can be quick coupled to ship air exhaust and water circulating systems so that when the container is aboard ship it can utilize the ships systems including power and be relieved from operating on its own self-contained power generator which is operated only when external power is not available as during land transportation aboard a truck trailer or railroad car. The unit has other novel features and controls peculiarly adapted for use in such a container unit.

U.S. Pat. No. 6,929,061, issued to Lajeunesse on Aug. 16, 2005, discloses a self-contained, portable, computer operated, light weight, temperature controlled compartment for installation in emergency vehicles has insulated walls and a door. The compartment carries a mechanical refrigeration system having a small compressor for cooling the interior and electrical heating units providing radiant heat to the interior. The heating and cooling units are controlled by a microcomputer and temperature sensor to keep the interior within a desired range of temperature.

U.S. Pat. No. 3,792,595, issued to Willis on Feb. 19, 1974, discloses a cooling apparatus used within a transportable refrigeration compartment for preserving perishables. The apparatus includes the combination of a heat exchanger having an exit nozzle for producing and discharging a gaseous cooling medium and a venturi-type conduit. The venturi conduit comprises an exit end and a flared inlet end which is aligned longitudinally apart from the heat exchanger exit nozzle and in a predetermined spaced relationship therewith. Gas ambient to the compartment and the cooling medium being ejected from the heat exchanger can be mixed within the flared end, with the tempered mixture being exhausted through the venturi conduit exit end and into the storage compartment. To provide an induced circulation of the tempered mixture throughout the compartment, the venturi conduit flared inlet end and the heat exchanger exit nozzle may be enclosed by a hollow duct having both the front and back walls removed so as to induce an aspiration effect therein.

U.S. Pat. No. 3,961,925, issued to Rhoad on Jun. 8, 1976, discloses a portable, self-contained, refrigerated storage and transportation container for preserving perishable commodities includes an insulated storage chamber for the perishable commodities. A recirculating liquid cooling system is provided within the container and includes conduit and nozzle means disposed within the storage chamber adapted to spray a liquid coolant, such as chilled brine, directly onto the perishable commodities to maintain them at a uniform cool temperature. The sprayed liquid coolant is collected in the bottom portion of the storage chamber. A closed refrigeration system is also provided within the container and includes, in part, heat exchange means disposed within the bottom portion of the storage chamber for cooling the sprayed liquid coolant which has collected there.

U.S. Pat. No. 3,604,218, issued to Cresti on Sep. 14, 1971, discloses an insulated container for perishable goods comprises a pair of convergent passages defined by the upper wall of the container, a pair of convergent passages defined by the lower wall of the container and sets of channels open to the interior of the container formed in the respective sidewalls of the container, the channels extending between the convergent passages. When the container is filled with a load impervious to air, air is circulated through the passages and channels around the load. When the container is filled with a previous load, air is circulated through the channels and passages and passes through the load directly from one set of passages to the other.

Japanese Patent No. 7,151,439 A2, filed by Tadashi et al. and published on Jun. 16, 1995, discloses a refrigerated container for transporting frozen food.

U.S. Pat. No. 6,012,384, issued to Badalament et al. on Jan. 11, 2000, discloses a mobile container adapted for transporting perishable goods includes a front wall, a rear wall, a pair of side walls extending there between so as to define an elongated enclosure having a longitudinal axis and adapted to receive a cargo load. An air recirculation plenum is defined in the enclosure adjacent to the front wall. A refrigeration system is in fluid communication with the air recirculation plenum and is adapted to induct air at a first temperature and to exhaust air at a second temperature. A pair of air delivery plenums extends from the bulkhead along the length of the enclosure parallel to the longitudinal axis. Each of the pair of air delivery plenums is defined by a corresponding one of the pair of side walls and a plenum wall disposed spaced from the corresponding side wall and extending from the upper margins of the enclosure such that the plenum wall is adapted to be co-extensive and in abutting contact with a portion of the cargo load. The container also includes a source of pressurized air having an inlet in fluid communication with the exhausted air from the refrigeration system and an outlet in fluid communication with the pair of air delivery plenums. A return air plenum is defined between the air delivery plenums such that the cool air is supplied under pressure along the longitudinal length of the enclosure parallel to and adjacent the pair of side walls and then flows through the cargo load in a direction substantially transverse to the longitudinal axis into the return air plenum whereafter the air flows substantially parallel to the longitudinal axis back to the air recirculation plenum.

U.S. Pat. No. 5,727,352, issued to Bared et al. on Mar. 17, 1998, discloses a modular convenience store. The store has a floor and a plurality of walls extending substantially vertically from the floor, which define a perimeter of the store, which has an interior and exterior. This plurality of walls includes a front wall, a rear wall, a left wall, and a right wall. The front wall is less than or equal to sixty feet long. The rear wall is less than or equal to sixty feet long and substantially opposing the front wall. The left wall is less than or equal to fourteen feet long, and the right wall is less than or equal to fourteen feet long and substantially opposing the left wall. A roof covers the interior of the store. A front door is substantially intermediate the front wall, and a rear door is substantially intermediate the rear wall. A walk-in cooler, with an interior, is located within the interior of the store, adjacent the left and rear walls, left of the rear door, and spaced from the front wall. An exterior cooler-service door is provided for passage directly between the exterior of the store and the interior of the cooler. An interior cooler-service door is provided for passage between the interior of the cooler and the interior of the store. The store is assembleable off-site and transportable as a single unit.

U.S. Pat. No. 5,249,438, issued to Rhaney et al. on Oct. 5, 1993, discloses a mobile cooler including a compartment having pivotable wheels and a handle assembly for pulling the cooler. A pair of wheel assemblies individually pivots within recesses in the cooler from a raised to a lowered position. In the lowered position the cooler can be transported over smooth or uneven terrain. The handle telescopes partly into the compartment, and partly folds down by a pair of hinges to fit within recesses in the compartment lid. The handle length can be adjusted to suit the user.

U.S. Pat. No. 4,932,677, issued to Shustack on Jun. 12, 1990, discloses a mobile cooler having a flexible tank track for moving the cooler over sand or irregular ground surfaces. The track members of the flexible tank track are normally made of rubber and are recessed into the outermost surfaces of the side walls of the insulated container to improve appearance of the cooler and to provide minimum obstruction to other articles when the cooler is stored in trunks or other compartments of automobiles. A retractable cord, attached to a spring loaded pulley recessed into the lower front wall of the cooler, facilitates towing of the cooler from place to place in a picnic area. A vertical leveling slot in each of the front axle supports keeps the track members in maximum contact with the surface of the ground during the towing process. Conventional pivotable handles attached to the front and back walls of the insulated container allow the cooler to be easily lifted or lowered in storing or retrieving the unit from storage.

U.S. Pat. No. 6,502,656, issued to Weiss et al. on Jan. 7, 2003, discloses a selectively configurable storage container for storing and transporting items through various environments includes a housing having at least one surrounding sidewall and a bottom which defines an enclosure. The storage container also includes a motor with at least one drive assembly. The drive assembly is selectively engagable with a first member, e.g., a wheel, and is configured to move the housing relative to a first terrain, e.g., a floor. The drive assembly is also interchangeable with at least one additional member configured to move the housing relative to a different terrain or environment, e.g., sand, water, grass, etc. A steering control cooperates with the drive assembly to navigate the housing through either the first or the different terrain.

While these patents and other previous methods have attempted to solve the above mentioned problems, none have utilized or disclosed a self-contained mobile walk-in cooler that is comprised of a commercial refrigeration unit, a gasoline generator to provide power to the refrigeration unit when a permanent power source is unavailable, and a mobile carriage for quick and easy transport, as does the present invention.

Therefore, a need exists for a mobile cooler with these attributes and functionalities. The self-contained mobile walk-in cooler according to the present invention substantially departs from the conventional concepts and designs of the prior art. It can be appreciated that there exists a continuing need for new and improved mobile coolers which can be used commercially. In this regard, the present invention substantially fulfills these objectives.

The foregoing patent and other information reflect the state of the art of which the inventor is aware and are tendered with a view toward discharging the inventor's acknowledged duty of candor in disclosing information that may be pertinent to the patentability of the present invention. It is respectfully stipulated, however, that the foregoing patent and other information do not teach or render obvious, singly or when considered in combination, the inventor's claimed invention.

BRIEF SUMMARY OF THE INVENTION

The general purpose of the present invention, which will be described subsequently in greater detail, is to provide a self-contained mobile walk-in cooler. In particular, the present invention relates to a self-contained mobile walk-in cooler that is comprised of a cooler, a commercial refrigeration unit, a gasoline generator to provide power to the refrigeration unit when a permanent power source is unavailable, and a mobile carriage for quick and easy transport.

The cooler is made of heavy duty construction. The cooler is specifically comprised of four-inch thick rigid, chlorofluorocarbon-free, urethane form-in-place modular panels with 22-gauge embossed Galvalume® Plus skins to provide for outstanding thermal efficiency, accommodating temperatures ranging from as low as minus 40 degrees Fahrenheit to as high as 250 degrees Fahrenheit. This temperature efficiency range is aided by the fact that the Galvalume® Plus skins have an R-value, a measure of resistance to heat flow, of R-30, a high rating in terms of resistance to heat flow. One advantage of using GalValume® Plus skins is that such skins provide resistance to stains from storage and from transit corrosion. Additionally, the modular panels are comprised of tongue-and-groove panel edges, which keep the urethane insulation tightly joined together. Such edge technology ensures maximum insulating efficiency and structural integrity for the cooler. The cooler floor is comprised of a one-hundredth of an inch thick aluminum tread plate that is NSF approved. The aluminum tread plate floor surface is also easily cleaned and provides better traction and less slippage. The floor will support evenly distribute loads up to 750 pounds per square foot. The door panel of the cooler includes a door that is hinged on the right and includes a non positive latch with a cylinder lock. The door is has a width of 34 inches wide and a height 75 inches. Furthermore, the cooler door includes a safety mechanism to allow exit from the cooler even when the cooler door is padlocked. The cooler has a shatterproof interior for safety and efficiency. The cooler also comprises a vapor-proof light in its interior that is wired to an exterior weatherproof. The cooler can be manufactured in a variety of sizes, but three embodiments suggested are 1) a six foot width, eight foot length, and a seven and a half foot height 2) a six foot width, twelve foot length and a seven and a half foot height and 3) a six foot width, sixteen foot length, and a seven and a half foot height. The cooler size is suitable to be permanently placed on the mobile carriage for easy transport.

The commercial refrigeration unit is comprised of a compressor, evaporator coil, refrigerant, and a refrigeration unit cover. Although the present invention may utilize various compressors and evaporator coils, a preferred embodiment includes the use of a Copeland® compressor for the commercial refrigeration unit. A three quarter horsepower compressor is to be used on the coolers which are eight or twelve feet in length, and a one horsepower unit on a cooler that is sixteen foot in length. Additionally, the commercial refrigeration unit, in its preferred embodiment, is comprised of a Heatcraft™ evaporator coil. For the cooler to maintain a temperature of approximately 35 degrees Fahrenheit, the refrigerant R22 is used. Alternatively, for the cooler to maintain a temperature of approximately 0 degrees Fahrenheit, the refrigerant R404 is used. The refrigeration unit cover is placed over the portions of the commercial refrigeration unit that are located outside of the cooler. The refrigeration unit cover has a multitude of louvers located on each side for admitting air and ensuring adequate ventilation.

The commercial refrigeration unit is securely mounted to the cooler by means of a frame. This frame is saddled over the cooler front panel, allowing some components of the refrigeration unit system to be outside of the cooler and other co components of the refrigeration unit system to be inside the cooler. The frame is comprised of rectangular aluminum tubes and aluminum triangular plates to secure adjacent aluminum tubes for structural reinforcement. These triangular plates, as they are placed on the inside edge of the cooler front panel further provide support for the weight of the refrigeration unit.

The power unit system is comprised of a gasoline powered generator, a gasoline canister, and a generator housing unit. The generator housing unit is further comprised of a generator housing mounting tray, a generator housing cap, a generator housing battery box and battery hold down, and a receptacle for shoreline connection. The generator may be one of many in the marketplace; however, in the preferred embodiment of this invention, a gasoline-powered Honda EV4010 generator is used. This generator is a 4,000 Watt, 30 amp, 120 volt, 60 hertz, and twin-cylinder liquid cooled generator. Additionally such a generator is compact and quiet for use in the self-contained mobile walk-in cooler. The gasoline canister has a capacity of 15 gallons of gasoline, providing a maximum of 22 hours of operation before the need to refuel arises. In addition to use with a gasoline-powered generator, the self-contained mobile walk-in cooler may be use with a 120 volt, 20 amp shoreline connection. Furthermore, the power unit system of the self-contained mobile walk-in cooler will automatically switch between the gasoline-powered generator and a shoreline power source. The power unit system has over-current protection. The power unit system also has a weather-proof duplex receptacle, providing two 120 volt electrical outlets for use as a receptacle for shoreline connection.

The mobile carriage system, by which the cooler is made mobile, is comprised of a trailer frame, two trailer axles, four trailer wheels, and four trailer tires. Although the trailer frame can be manufactured from various materials, those used in the preferred embodiment of this invention are noted. The trailer frame is constructed of five-inch steel "C" channel on the perimeter and three-inch steel "C" channel cross members. Additionally the trailer frame has a heavy-duty double-frame tongue. The two trailer axles are 5,200-pound Dexter Torflex® rubber suspension axles, providing independent wheel suspension, rubber cushioning, and shock absorption. Dexter electric brakes are used on each trailer axle. The trailer tires used in the preferred embodiment of this invention are LT225/75R-15, E. The trailer wheels in the preferred embodiment of this invention are chrome 15"×7"; 6 lug×5.5" B.C. The trailer frame of the mobile carriage system is further comprised of LED running and clearance lights.

One advantage of the present invention is highlighted by the use of a self-contained mobile walk-in cooler after storms, hurricanes, or other natural disasters in which there are power outages preventing conventional means of refrigeration. The fact that the self-contained mobile walk-in cooler has a power system unit comprised of both a gasoline generator and means of obtaining shoreline power, allows for the cooler to be cooled by its own power source when shoreline electricity is unavailable. The fact that the self-contained mobile walk-in cooler is mobile is advantageous because it allows for easy transport to a location in need of emergency storage. Many of the patents in the prior art provide refrigeration but are not mobile. This present invention is advantageous because of its easy mobility. Therefore, a self-contained mobile walk-in cooler is useful for emergency storage.

Another advantage of the present invention is that the self-contained mobile walk-in cooler can be used for storage of items needing refrigeration by a person who travels in his or her occupation. For example, a caterer, florist, or an exhibitor at a trade show or arts-and-crafts fair may use the self-contained mobile walk-in cooler to refrigerate or cool items while in transit or at the intended destination.

Another advantage of the present invention is that the self-contained mobile walk-in cooler is very suitable for transportation of perishables. For example, restaurateurs, sea food companies, hunters, or butchers, or the like, may use the self-contained mobile walk-in cooler to transport perishables that by necessity need to remain refrigerated. The easy mobility of the self-contained mobile walk-in cooler is a further advantage of this invention.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is-not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further objects and advantages of the present invention will be apparent from the following detailed description of a presently preferred embodiment which is illustrated schematically in the accompanying drawings.

BRIEF DESCRIPTION OF THE SEVERAL VIEWS OF THE DRAWINGS

Other advantages and features of the invention are described with reference to exemplary embodiments, which are intended to explain and not to limit the invention, and are illustrated in the drawings in which.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
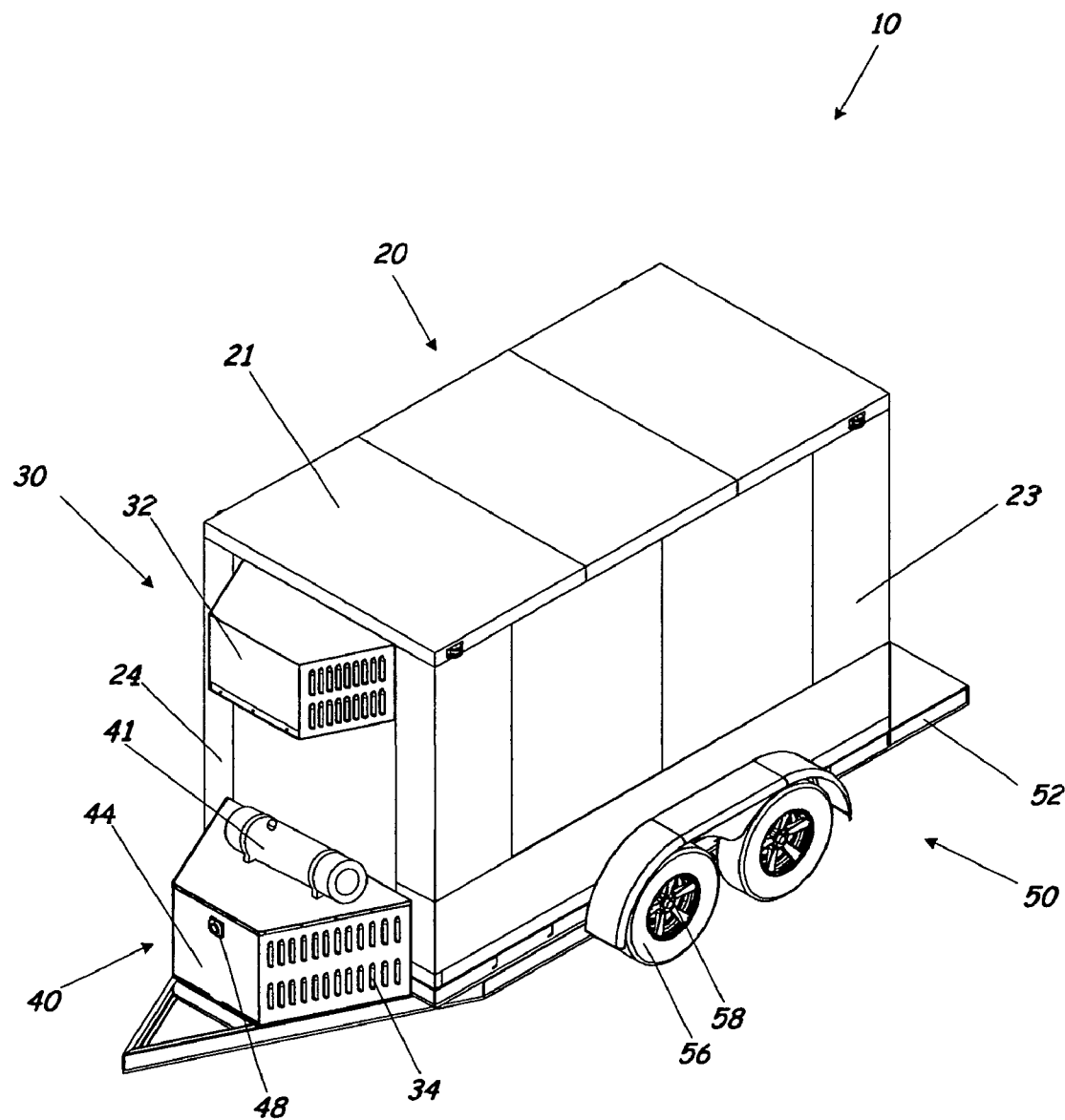
FIG. 1 is a perspective view of a self-contained mobile walk-in cooler according to an embodiment of the present invention.

Referring now to FIG. 1, a perspective view of a self-contained mobile walk-in cooler, 10, is shown. The self-contained mobile walk-in cooler, 10, is comprised of a cooler, 20, a refrigeration unit system, 30, a power unit system, 40, to provide power to the refrigeration unit system, 30, when a permanent power source is unavailable, and a mobile carriage system, 50, for quick and easy transport. The cooler, 20, is made of heavy duty construction.

The cooler, 20, is specifically comprised of four-inch thick rigid, chlorofluorocarbon-free, urethane form-in-place modular panels: the cooler top panel, 21, the cooler door panel, the cooler front panel, 24, two cooler side panels, 23, and a cooler floor. The cooler, 20, panels are manufactured with 22-gauge embossed Galvalume® Plus skins to provide for outstanding thermal efficiency, accommodating temperatures ranging from as low as minus 40 degrees Fahrenheit to as high as 250 degrees Fahrenheit. This temperature efficiency range is aided by the fact that the Galvalume® Plus skins have an R-value, a measure of resistance to heat flow, of R-30, a high rating in terms of resistance to heat flow. One advantage of using GalValume® Plus skins is that such skins provide resistance to stains from storage and from transit corrosion. Additionally, the modular panels are comprised of tongue-and-groove panel edges, which keep the urethane insulation tightly joined together. Such edge technology ensures maximum insulating efficiency and structural integrity for the cooler. The cooler floor is comprised of a one-hundredth of an inch thick aluminum tread plate that is NSF approved. The aluminum tread plate floor surface is also easily cleaned and provides better traction and less slippage. The cooler floor will support evenly distribute loads up to 750 pounds per square foot. The cooler, 20, has a shatterproof interior for safety and efficiency. The cooler, 20, also comprises a vapor-proof light in its interior that is wired to an exterior weatherproof. The cooler, 20, can be manufactured in a variety of sizes, but three embodiments suggested are 1) a six foot width, eight foot length, and a seven and a half foot height 2) a six foot width, twelve foot length and a seven and a half foot height and 3) a six foot width, sixteen foot length, and a seven and a half foot height. The cooler, 20, size is suitable to be permanently placed on the mobile carriage system, 50, for easy transport.

The refrigeration unit system, 30, is comprised of a compressor, evaporator coil, refrigerant, and a refrigeration unit cover, 32. Although the present invention may utilize various compressors and evaporator coils, a preferred embodiment includes the use of a Copeland® compressor for the refrigeration unit. A three quarter horsepower compressor is to be used on a cooler, 20, which is eight or twelve feet in length, and a one horsepower unit on a cooler, 20, that is sixteen foot in length. Additionally, the refrigeration unit, in its preferred embodiment, is comprised of a Heatcraft™ evaporator coil. For the cooler, 20, to maintain a temperature of approximately 35 degrees Fahrenheit, the refrigerant, R22, is used. Alternatively, for the cooler to maintain a temperature of approximately 0 degrees Fahrenheit, the refrigerant, R404, is used. The refrigeration unit cover, 32, is placed over the portions of the refrigeration unit that are located outside of the cooler, 20. The refrigeration unit cover, 32, has a multitude of louvers, 34, located on each side for admitting air and ensuring adequate ventilation.

The power unit system, 40, is comprised of a gasoline powered generator, a gasoline canister, 41, and a generator housing, 44. The generator housing, 44, is further comprised of a generator housing mounting tray, a generator housing cap, a generator housing battery box and battery hold down, and a receptacle for shoreline connection, 48. The gasoline-powered generator may be one of many in the marketplace; however, in the preferred embodiment of this invention, a gasoline-powered Honda EV4010 generator is used. This gasoline-powered generator is a 4,000 Watt, 30 amp, 120 volt, 60 hertz, and twin-cylinder liquid cooled generator. Additionally such a generator is compact and quiet for use in the self-contained mobile walk-in cooler, 10. The gasoline canister, 41, has a capacity of 15 gallons of gasoline, providing a maximum of 22 hours of operation before the need to refuel arises. In addition to use with a gasoline-powered generator, the self-contained mobile walk-in cooler, 10, may be use with a 120 volt, 20 amp shoreline connection. Furthermore, the power unit system, 40, of the self-contained mobile walk-in cooler, 10, will automatically switch between the gasoline-powered generator and a shoreline power source. The power unit system, 40, has over-current protection. The power unit system, 40, also has a weather-proof duplex receptacle, providing two 120 volt electrical outlets for use as a receptacle for shoreline connection.

The mobile carriage system, 50, by which the cooler, 20, is made mobile, is comprised of a trailer frame, 52, two trailer axles, 54, four trailer wheels, 58, and four trailer tires, 56. Although the trailer frame, 52, can be manufactured from various materials, those used in the preferred embodiment of this invention are noted. The trailer frame, 52, is constructed of five-inch steel "C" channel on the perimeter and three-inch steel "C" channel cross members. Additionally the trailer frame, 52, has a heavy-duty double-frame tongue. The two trailer axles, 54, are 5,200-pound Dexter Torflex® rubber suspension axles, providing independent wheel suspension, rubber cushioning, and shock absorption. Dexter electric brakes are used on each trailer axle, 54. The trailer tires, 56, used in the preferred embodiment of this invention are LT225/75R-15, E. The trailer wheels, 58, in the preferred embodiment of this invention are chrome 15"×7"; 6 lug×5.5" B.C. The trailer frame, 52, of the mobile carriage system, 50, is further comprised of LED running and clearance lights for traffic safety.

Figure 2:
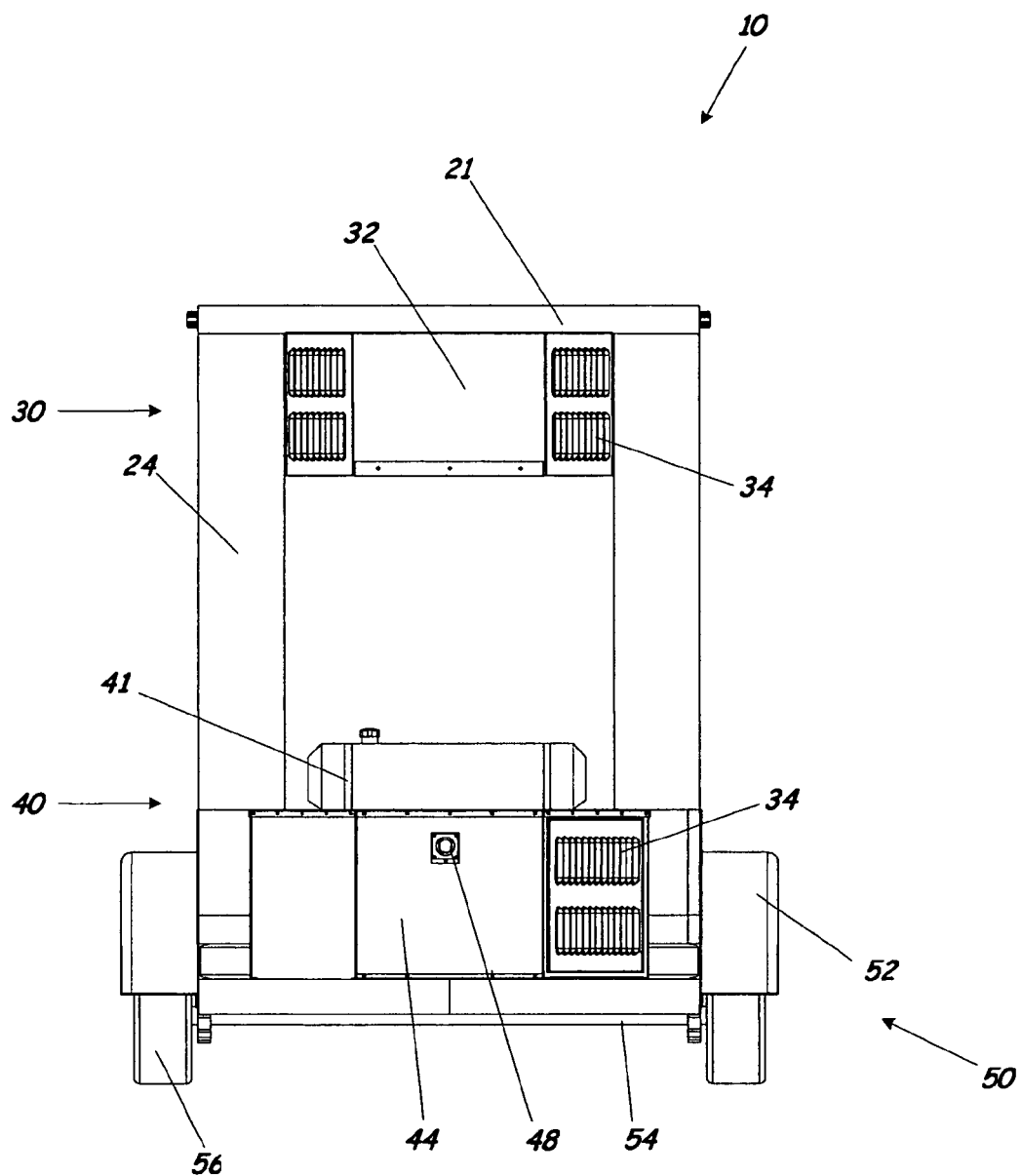
FIG. 2 is a back, planar view of a self-contained mobile walk-in cooler according to an embodiment of the present invention.

Referring now to FIG. 2, a back, planar view of a self-contained mobile walk-in cooler, 10, is shown. Two panels of the cooler, 20, are illustrated in this drawing: the cooler front panel, 24, and the cooler top panel, 21. The refrigeration unit system, 30, is illustrated with a refrigeration unit cover, 32, which is placed over the portions of the refrigeration unit that are located outside of the cooler, 20. The refrigeration unit cover, 32, also has a multitude of louvers, 34, located on each side for admitting air and ensuring adequate ventilation. The power unit system, 40, is shown with a gasoline powered generator, a gasoline canister, 41, a receptacle for shoreline connection, 48, and a generator housing, 44, with a multitude of louvers, 34, located on each side for admitting air and ensuring adequate ventilation. The mobile carriage system, 50, by which the cooler, 20, is made mobile, is illustrated with of a trailer frame, 52, trailer axles, 54, and trailer tires, 56.

Figure 3:
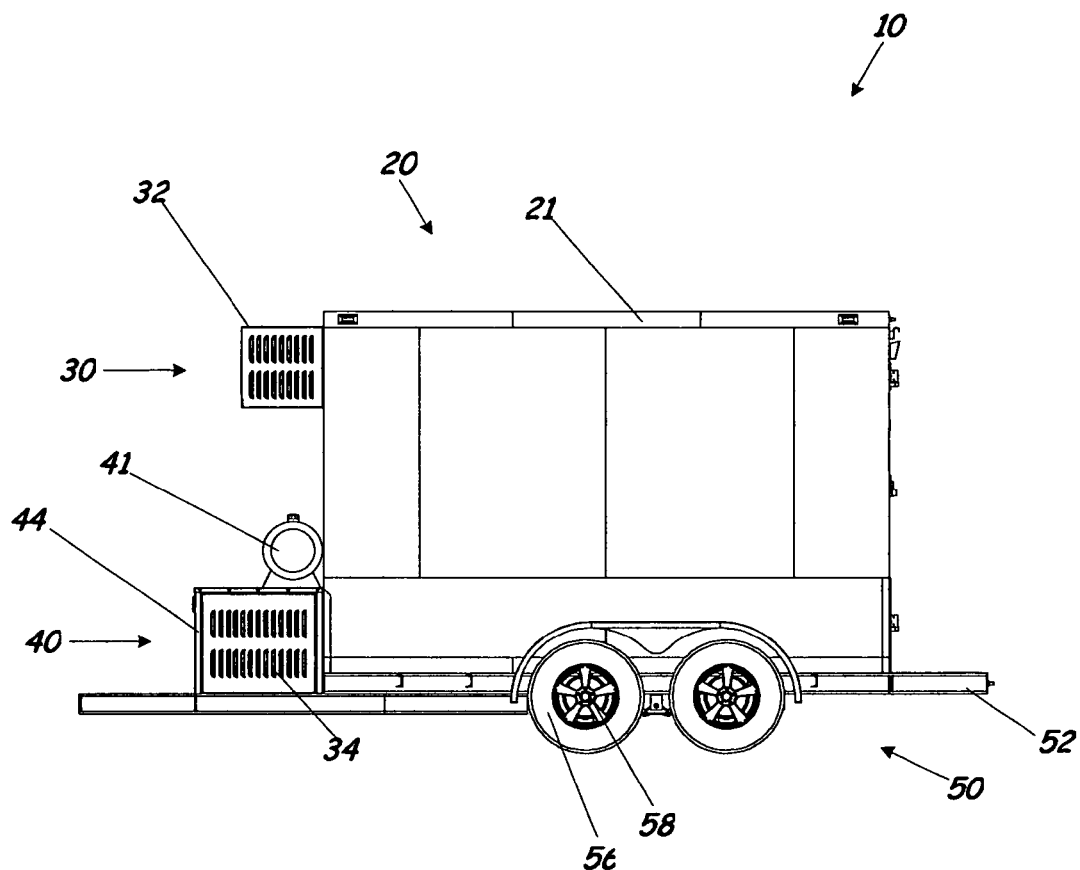
FIG. 3 is a left side, planar view of a self-contained mobile walk-in cooler according to an embodiment of the present invention.

Referring now to FIG. 3, a left side, planar view of a self-contained mobile walk-in cooler, 10, is shown. The cooler, 20, is illustrated with the cooler top panel, 21. The refrigeration unit system, 30, is illustrated with a refrigeration unit cover, 32, which is placed over the portions of the refrigeration unit that are located outside of the cooler, 20. The refrigeration unit cover, 32, also has a multitude of louvers, 34, located on each side for admitting air and ensuring adequate ventilation. The power unit system, 40, is shown with a gasoline powered generator, a gasoline canister, 41, and a generator housing, 44, with a multitude of louvers, 34, located on each side for admitting air and ensuring adequate ventilation. The mobile carriage system, 50, by which the cooler, 20, is made mobile, is illustrated with of a trailer frame, 52, trailer wheels, 58, and trailer tires, 56.

Figure 4:
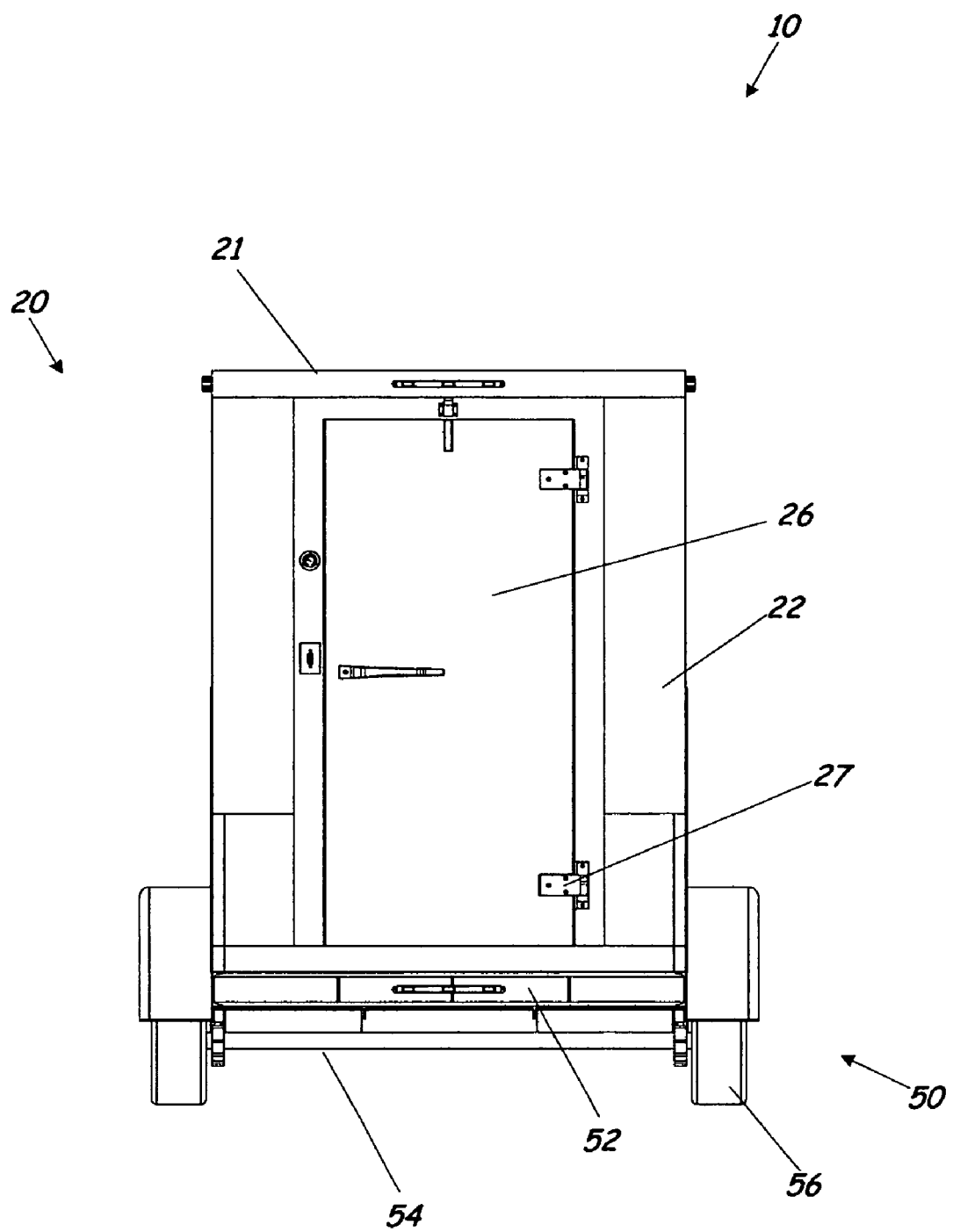
FIG. 4 is a back side, planar view of a self-contained mobile walk-in cooler according to an embodiment of the present invention.

Referring now to FIG. 4, a back side, planar view of a self-contained mobile walk-in cooler, 10, is shown. Two panels of the cooler, 20, are illustrated in this drawing: the cooler door panel, 22, and the cooler top panel, 21. The cooler door, 26, is shown in the cooler door panel, 22. The cooler door panel, 22, of the cooler, 20, includes a cooler door, 26, that is hinged on the right, with a cooler door hinge, 27, at both the top-right and bottom-right sides. The cooler door, 26, also includes a non positive latch with a cylinder lock. The cooler door, 26, is has a width of 34 inches wide and a height 75 inches. Furthermore, the cooler door, 26, includes a safety mechanism to allow exit from the cooler, 20, even when the cooler door, 26, is padlocked. The mobile carriage system, 50, by which the cooler, 20, is made mobile, is illustrated with of a trailer frame, 52, trailer axles, 54, and trailer tires, 56.

Figure 5:
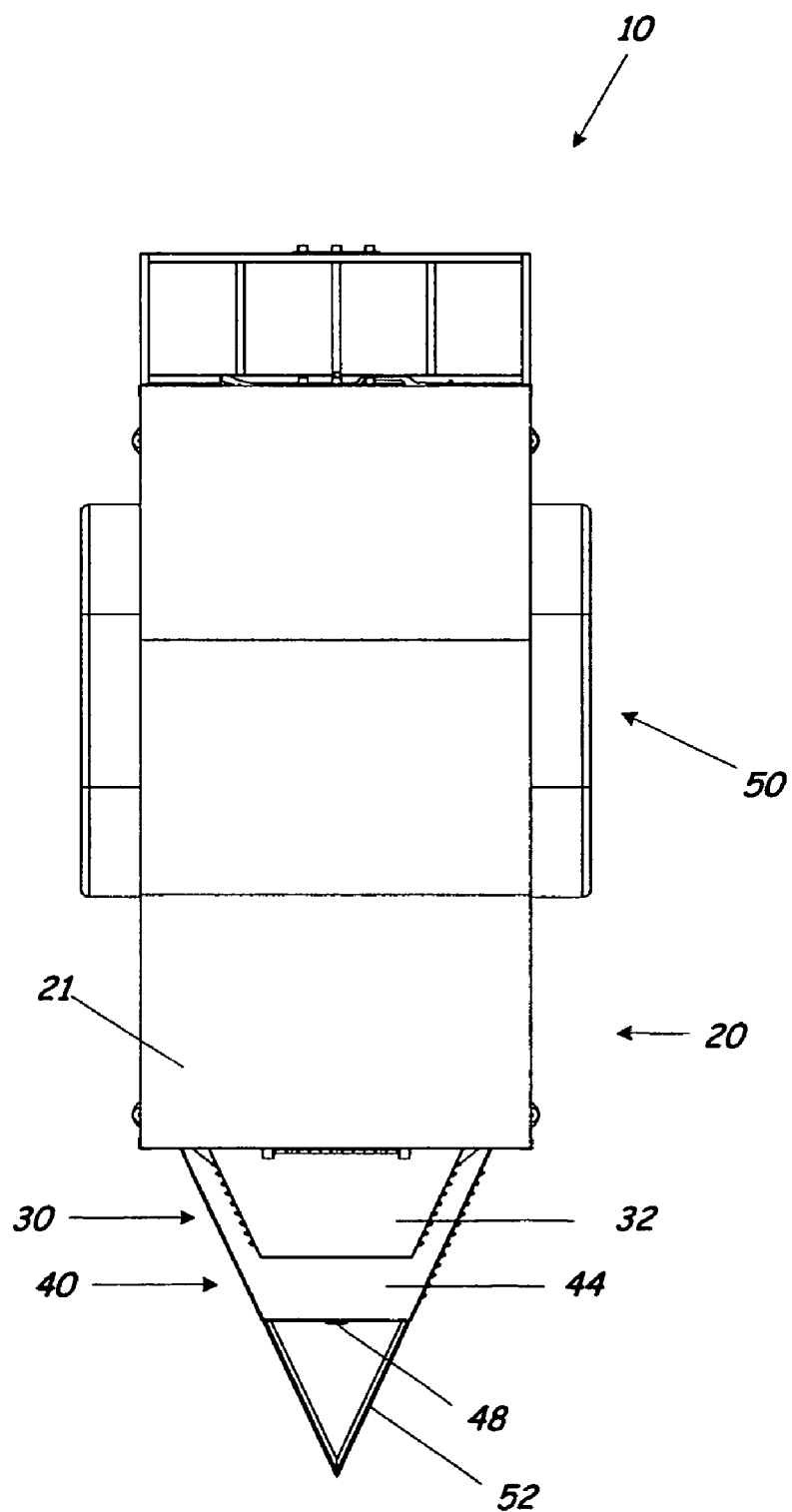
FIG. 5 is a top, planar view of a self-contained mobile walk-in cooler according to an embodiment of the present invention.

Referring now to FIG. 5 a top, planar view of a self-contained mobile walk-in cooler, 10, is shown. The cooler, 20, is illustrated with the cooler top panel, 21. The refrigeration unit system, 30, is illustrated with a refrigeration unit cover, 32, which is placed over the portions of the refrigeration unit that are located outside of the cooler, 20. The power unit system, 40, is shown with a receptacle for shoreline connection, 48, and a generator housing, 44. The mobile carriage system, 50, by which the cooler, 20, is made mobile, is illustrated with a trailer frame, 52.

Figure 6:
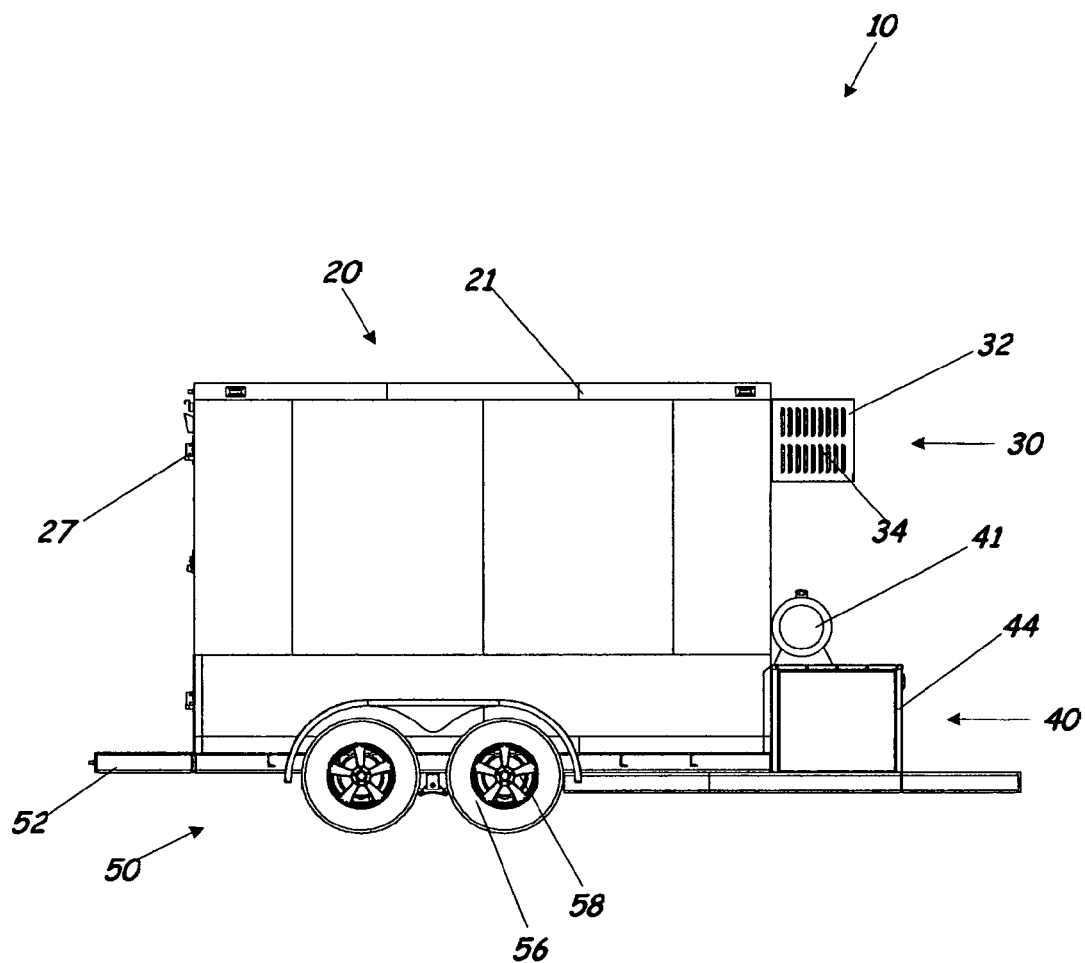
FIG. 6 is a right side, planar view of a self-contained mobile walk-in cooler according to an embodiment of the present invention.

Referring now to FIG. 6, a right side, planar view of a self-contained mobile walk-in cooler, 10, is shown. The cooler, 20, is illustrated with the cooler top panel, 21. The cooler, 20, is also shown with the cooler door hinges, 27. The refrigeration unit system, 30, is illustrated with a refrigeration unit cover, 32, which is placed over the portions of the refrigeration unit that are located outside of the cooler, 20. The refrigeration unit cover, 32, also has a multitude of louvers, 34, located on each side for admitting air and ensuring adequate ventilation. The power unit system, 40, is shown with a gasoline canister, 41, and a generator housing, 44. The mobile carriage system, 50, by which the cooler, 20, is made mobile, is illustrated with of a trailer frame, 52, trailer wheels, 58, and trailer tires, 56.

Figure 7:
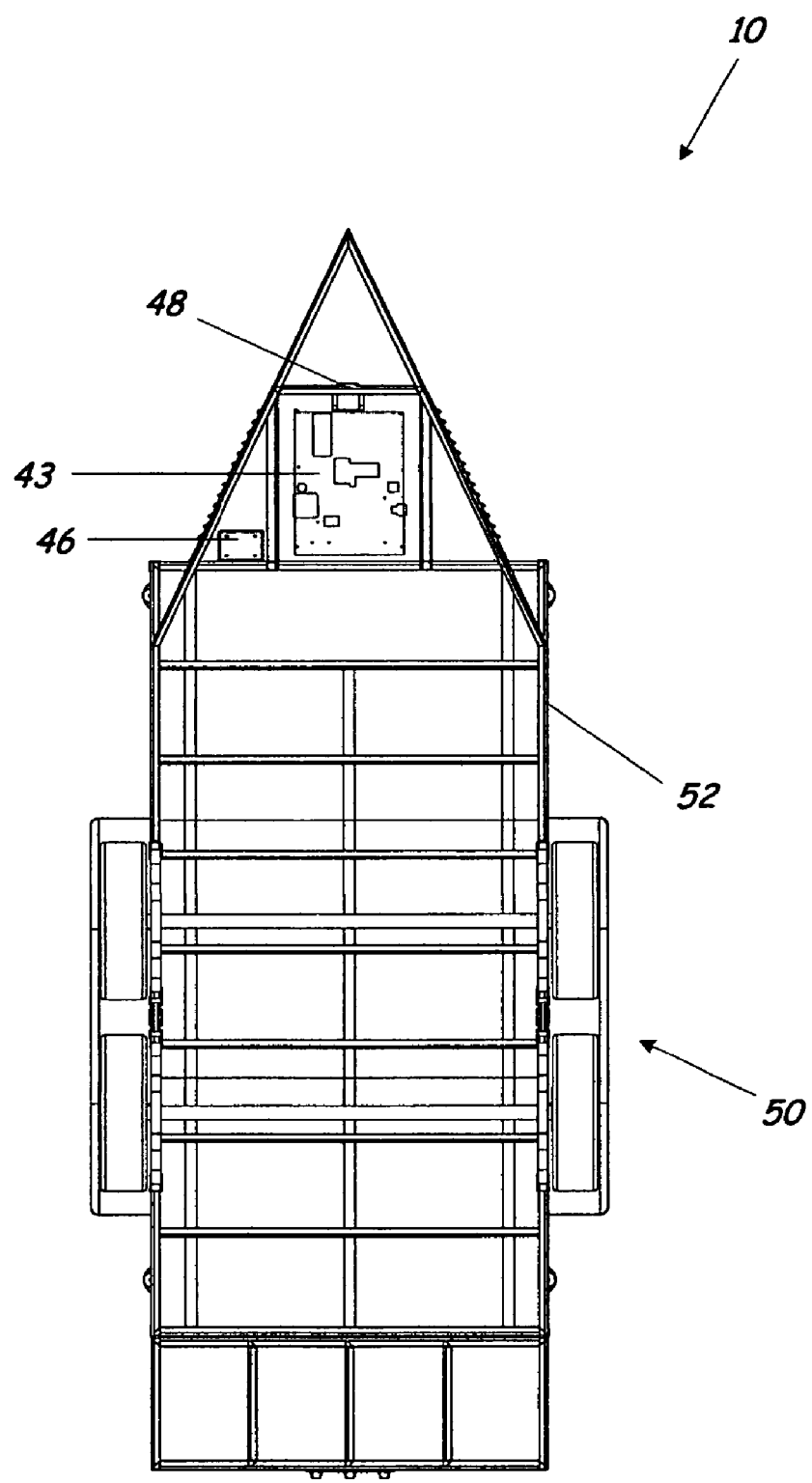
FIG. 7 is a top, cross-sectional view of a self-contained mobile walk-in cooler according to an embodiment of the present invention.

Referring now to FIG. 7, a top, cross-sectional view of a self-contained mobile walk-in cooler, 10, is shown. The generator housing mounting tray, 43, the generator housing battery box, 46, and the receptacle for shoreline connection, 48, are shown. The mobile carriage system, 50, by which the cooler, 20, is made mobile, is illustrated with of a trailer frame, 52.

Figure 8:
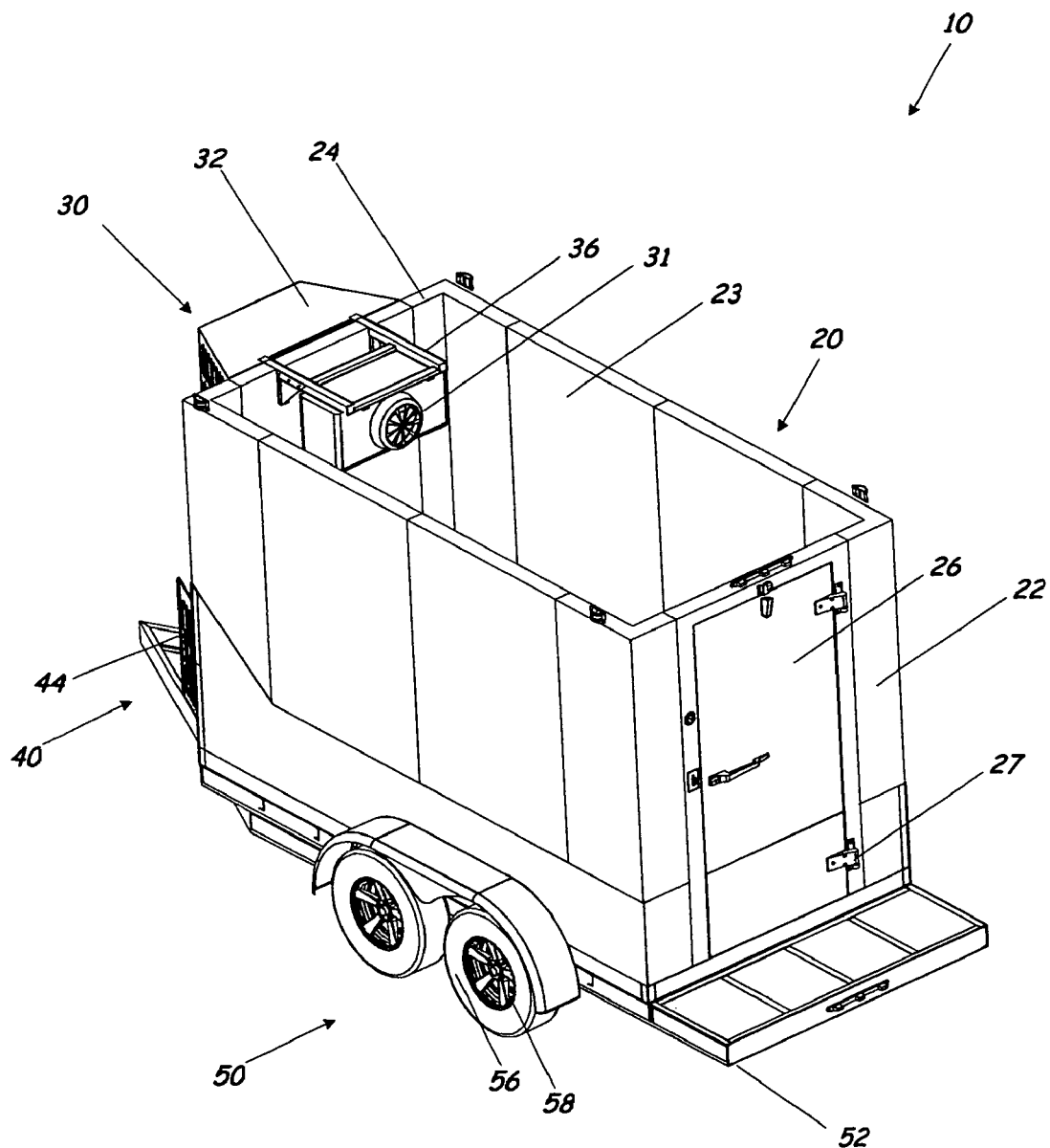
FIG. 8 is a perspective view of a self-contained mobile walk-in cooler, without the cooler top panel according to an embodiment of the present invention.

Referring now to FIG. 8, a perspective view of a self-contained mobile walk-in cooler, 10, is shown without the cooler top panel. The cooler, 20, is specifically comprised of four-inch thick rigid, chlorofluorocarbon-free, urethane form-in-place modular panels. The cooler door panel, 22, the cooler front panel, 24, the two cooler side panels, 23, and a cooler door, 26, located within the cooler door panel, 22, are shown. The cooler door panel, 22, of the cooler, 20, includes a cooler door, 26, that is hinged on the right, with a cooler door hinge, 27, at both the top-right and bottom-right sides. The cooler door, 26, also includes a non positive latch with a cylinder lock. The cooler door, 26, has a width of 34 inches wide and a height 75 inches. Furthermore, the cooler door, 26, includes a safety mechanism to allow exit from the cooler, 20, even when the cooler door, 26, is padlocked. The refrigeration unit system, 30, is illustrated with a refrigeration unit cover, 32, which is placed over the portions of the refrigeration unit that are located outside of the cooler, 20, and a frame, 36, with which the refrigeration unit, 31, is suspended. The commercial refrigeration unit is securely mounted to the cooler by means of a frame, 36. This frame, 36, is saddled over the cooler front panel, 24, allowing some components of the refrigeration unit system, 30, to be outside of the cooler, 20, and other co components of the refrigeration unit system, 30, to be inside the cooler, 20. The frame, 36, is comprised of rectangular aluminum tubes and aluminum triangular plates to secure adjacent aluminum tubes for structural reinforcement. These triangular plates, as they are placed on the inside edge of the cooler front panel, 24, further provide support for the weight of the refrigeration unit, 31. The power unit system, 40, is shown with a generator housing, 44. The mobile carriage system, 50, by which the cooler, 20, is made mobile, is illustrated with of a trailer frame, 52, trailer wheels, 58, and trailer tires, 56.

Figure 9:
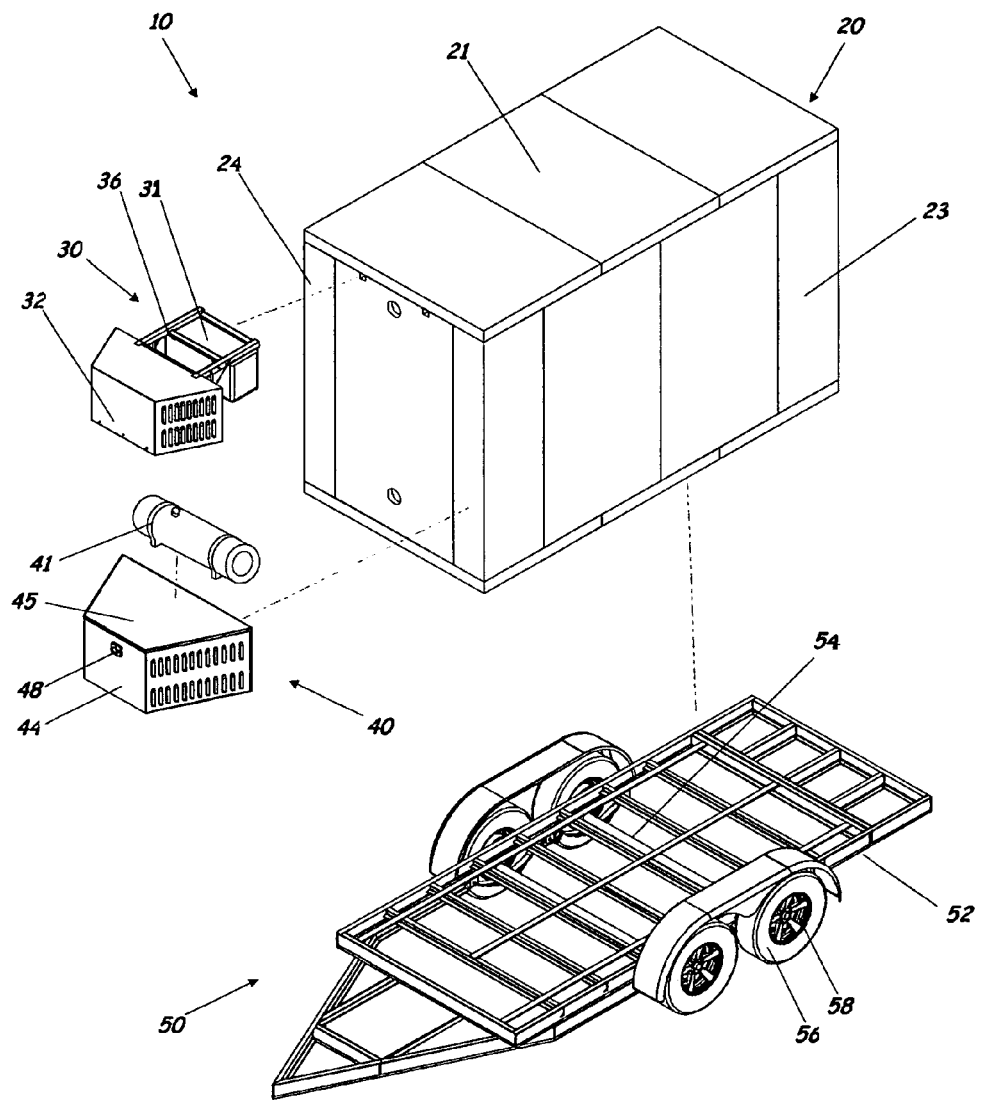
FIG. 9 is an exploded view of a self-contained mobile walk-in cooler according to an embodiment of the present invention.

Referring now to FIG. 9, an exploded view of a self-contained mobile walk-in cooler, 10, is shown. The cooler, 20, is shown with the cooler front panel, 24, a cooler side panel, 23, and a cooler top panel, 21. The refrigeration unit system, 30, is illustrated with a refrigeration unit cover, 32, which is placed over the portions of the refrigeration unit that are located outside of the cooler, 20, and a frame, 36, with which the refrigeration unit, 31, is suspended. The commercial refrigeration unit is securely mounted to the cooler by means of a frame, 36. This frame, 36, is saddled over the cooler front panel, 24, allowing some components of the refrigeration unit system, 30, to be outside of the cooler, 20, and other co components of the refrigeration unit system, 30, to be inside the cooler, 20. The frame, 36, is comprised of rectangular aluminum tubes and aluminum triangular plates to secure adjacent aluminum tubes for structural reinforcement. These triangular plates; as they are placed on the inside edge of the cooler front panel, 24, further provide support for the weight of the refrigeration unit, 31. The power unit system, 40, is shown with a gasoline canister, 41, a generator housing, 44, a generating housing cap, 45, and a receptacle for shoreline connection, 48. The mobile carriage system, 50, by which the cooler, 20, is made mobile, is illustrated with of a trailer frame, 52, trailer axles, 54, trailer wheels, 58, and trailer tires, 56.

Figure 10:
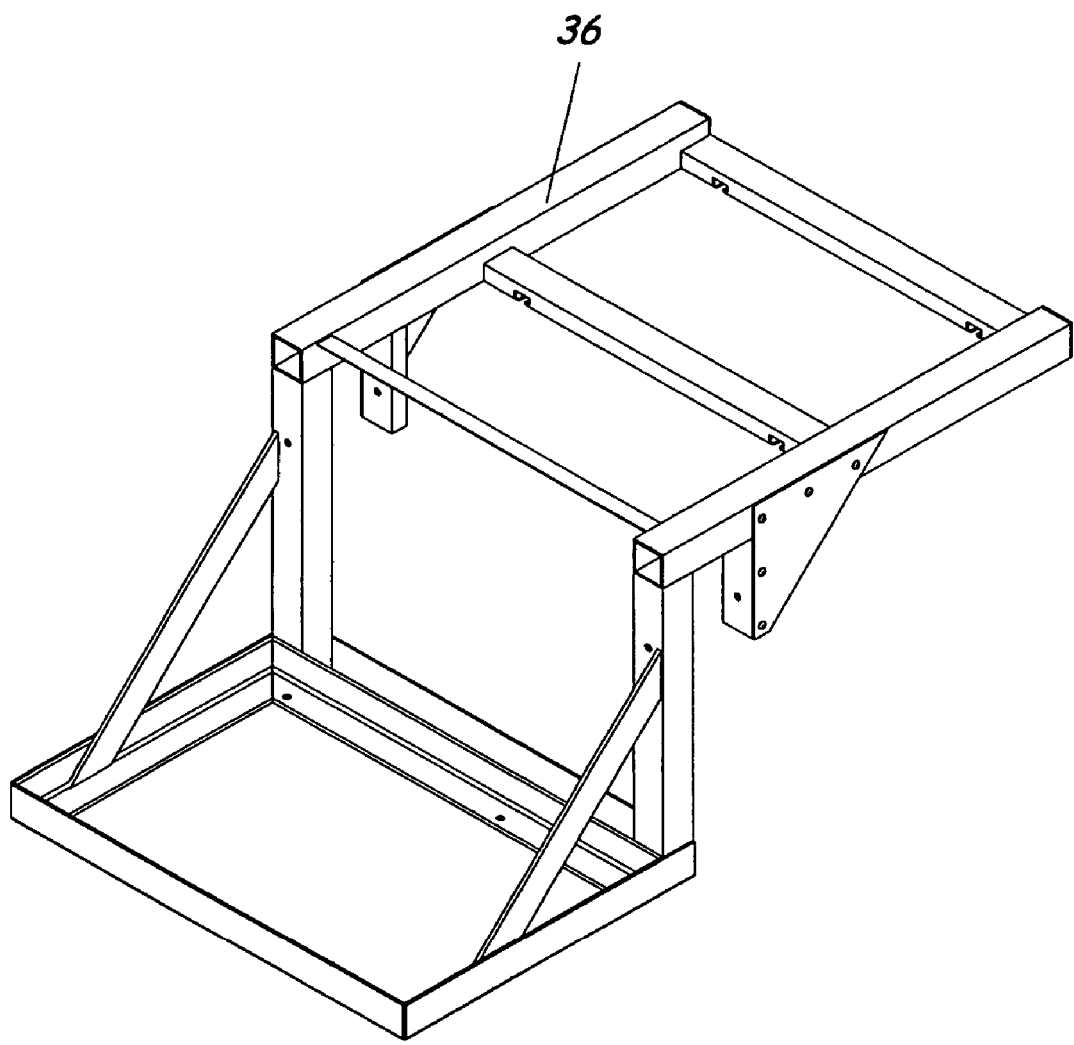
FIG. 10 is a perspective view of a frame according to an embodiment of the present invention.

Referring now to FIG. 10, a perspective view of a frame, 36, is shown. The commercial refrigeration unit is securely mounted to the cooler by means of a frame, 36. This frame, 36, is saddled over the cooler front panel, allowing some components of the refrigeration unit system to be outside of the cooler and other co components of the refrigeration unit system to be inside the cooler. The frame, 36, is comprised of rectangular aluminum tubes and aluminum triangular plates to secure adjacent aluminum tubes for structural reinforcement. These triangular plates, as they are placed on the inside edge of the cooler front panel further provide support for the weight of the refrigeration unit.

Figure 11:
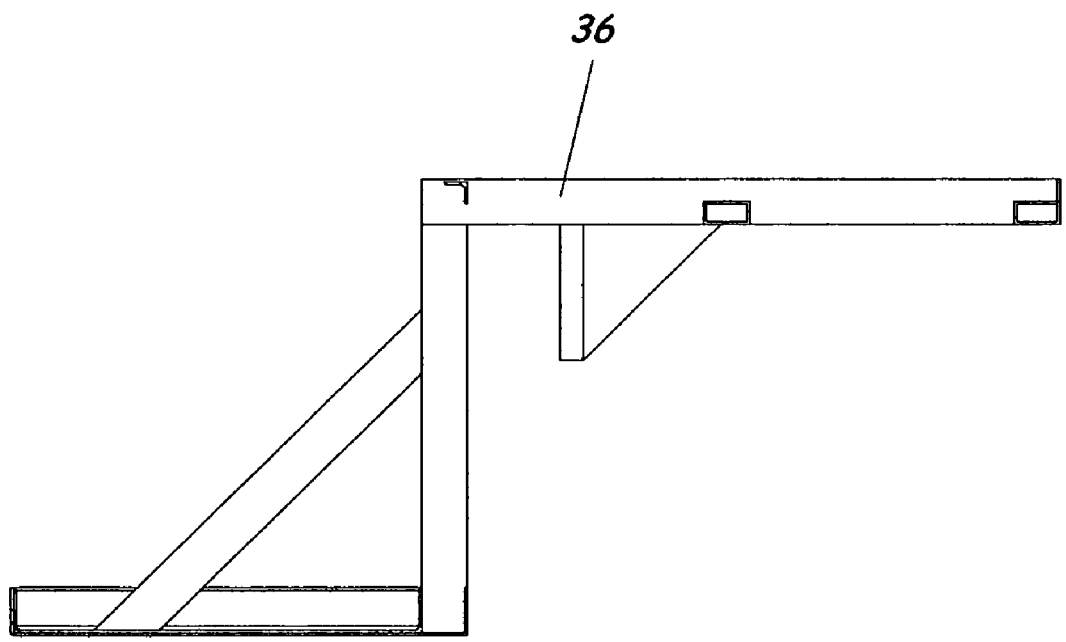
FIG. 11 is a side, planar view of a frame according to an embodiment of the present invention.

Referring now to FIG. 11, a side, planar view of a frame, 36, is shown. This frame, 36, is saddled over the cooler front panel, allowing some components of the refrigeration unit system to be outside of the cooler and other co components of the refrigeration unit system to be inside the cooler.

Figure 12:
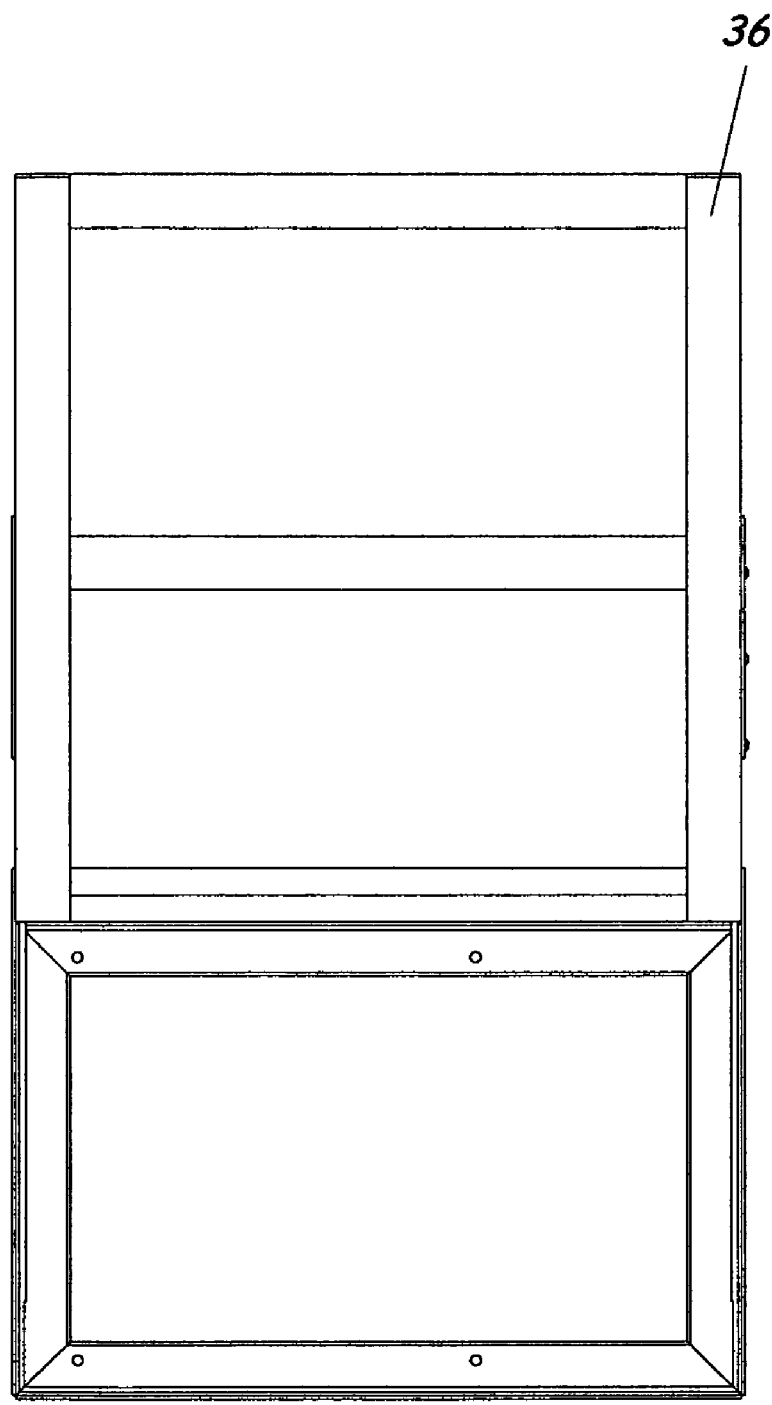
FIG. 12 is a top, planar view of a frame according to an embodiment of the present invention.

Referring now to FIG. 12, a top, planar view of a frame, 36, is shown. The frame, 36, is comprised of rectangular aluminum tubes and aluminum triangular plates to secure adjacent aluminum tubes for structural reinforcement. These triangular plates, as they are placed on the inside edge of the cooler front panel further provide support for the weight of the refrigeration unit.

Figure 13:
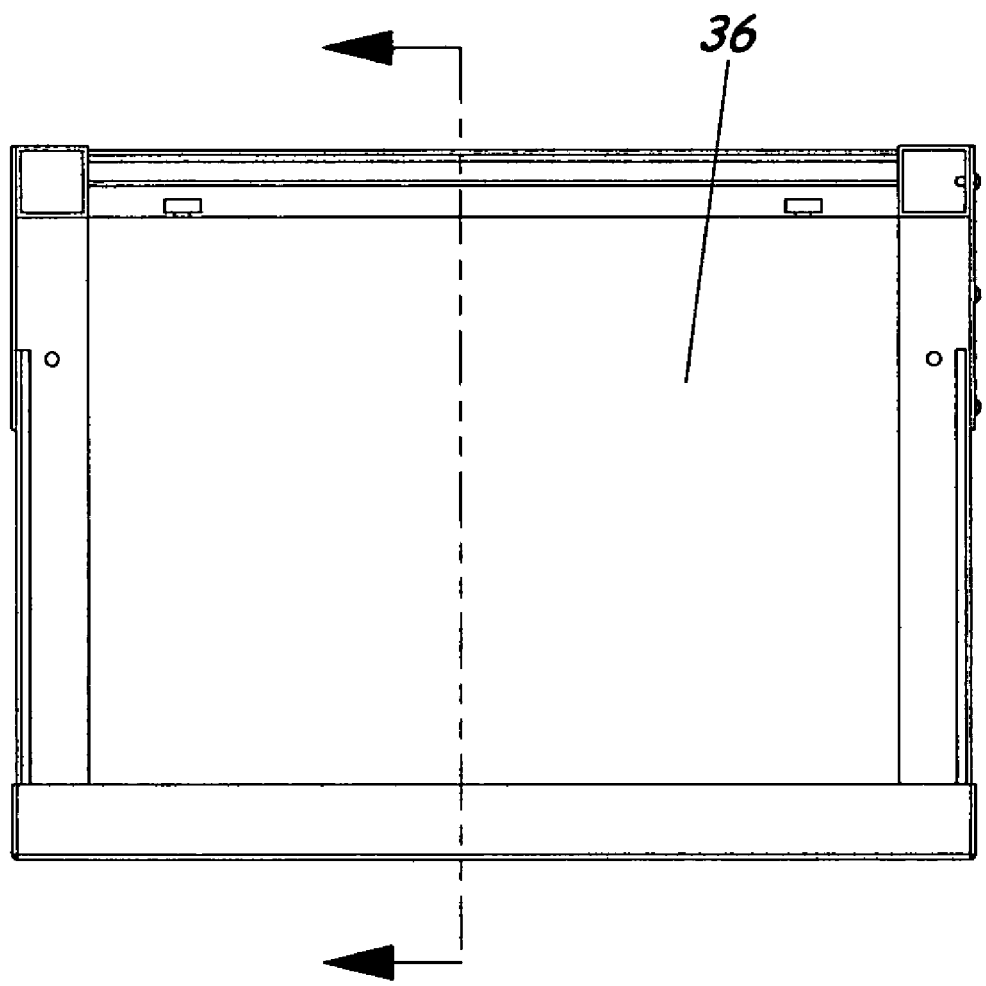
FIG. 13 is a front, planar view of a frame according to an embodiment of the present invention.

Referring now to FIG. 13, a front, planar view of a frame, 36, is shown.

Figure 14:
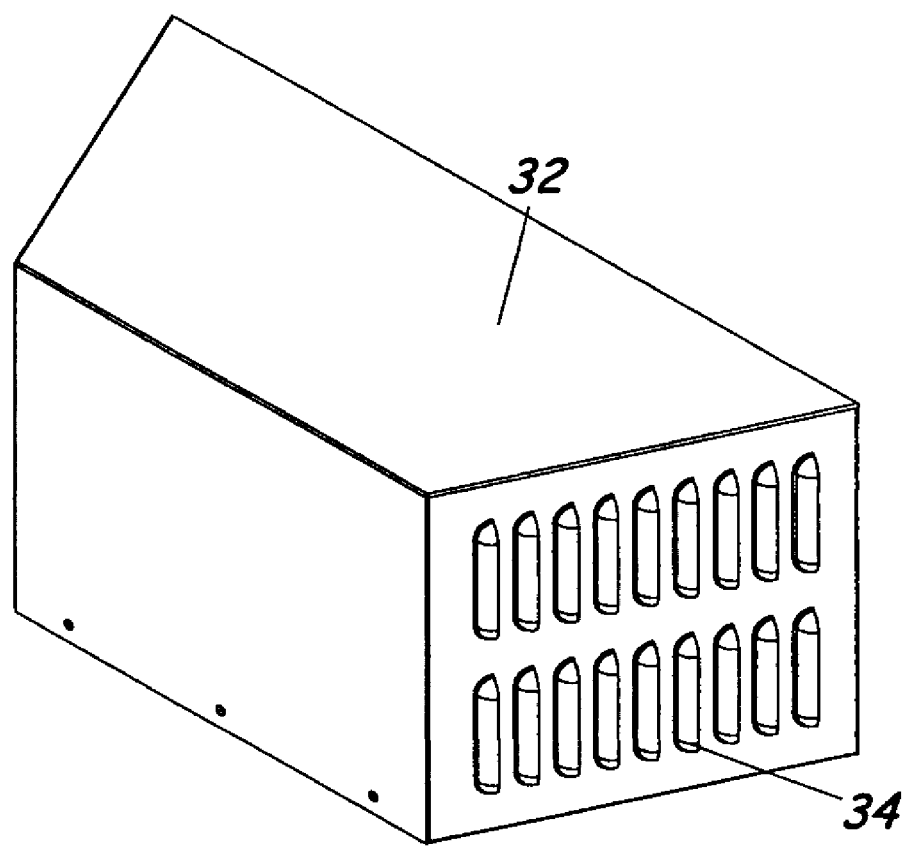
FIG. 14 is a front, perspective view of a refrigeration unit cover according to an embodiment of the present invention.

Referring now to FIG. 14, a front, perspective view of a refrigeration unit cover, 32, is shown. The refrigeration unit cover, 32, has louvers, 34, on each side to provide ventilation. The refrigeration unit cover, 32, is a component of the refrigeration unit system.

Figure 15:
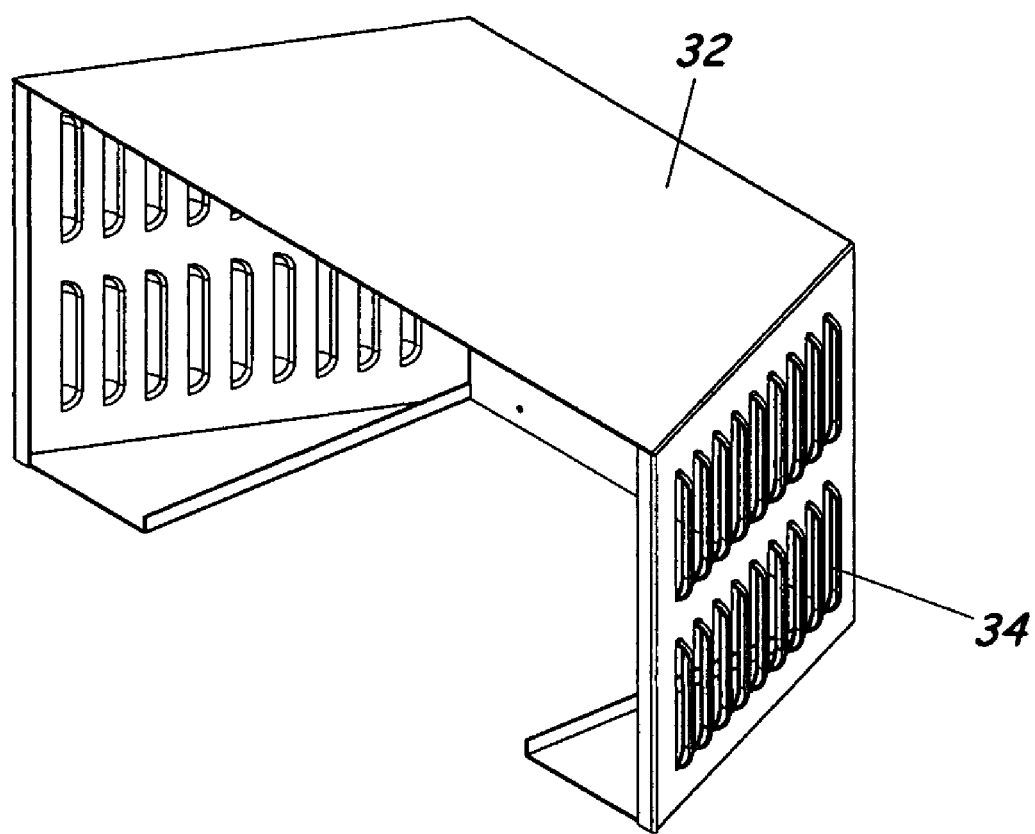
FIG. 15 is a rear, perspective view of a refrigeration unit cover according to an embodiment of the present invention.

Referring now to FIG. 15, a rear, perspective view of a refrigeration unit cover, 32, is shown. The refrigeration unit cover, 32, has louvers, 34, on each side to provide ventilation. The refrigeration unit cover, 32, is a component of the refrigeration unit system.

Figure 16:
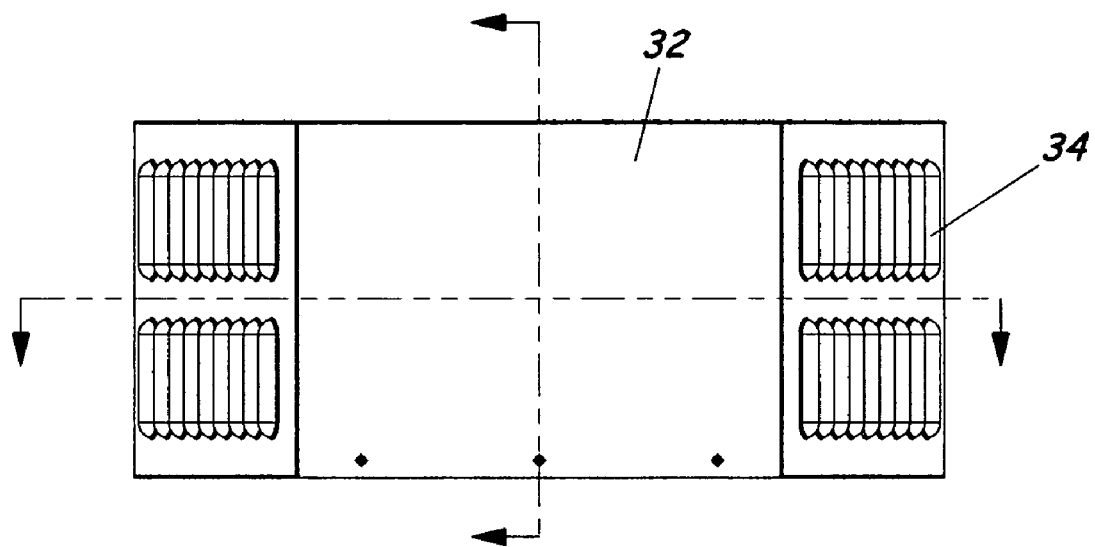
FIG. 16 is a front, planar view of a refrigeration unit cover according to an embodiment of the present invention.

Referring now to FIG. 16, a front, planar view of a refrigeration unit cover, 32, is shown. The refrigeration unit cover, 32, has louvers, 34, on each side to provide ventilation. The refrigeration unit cover, 32, is a component of the refrigeration unit system.

Figure 17:
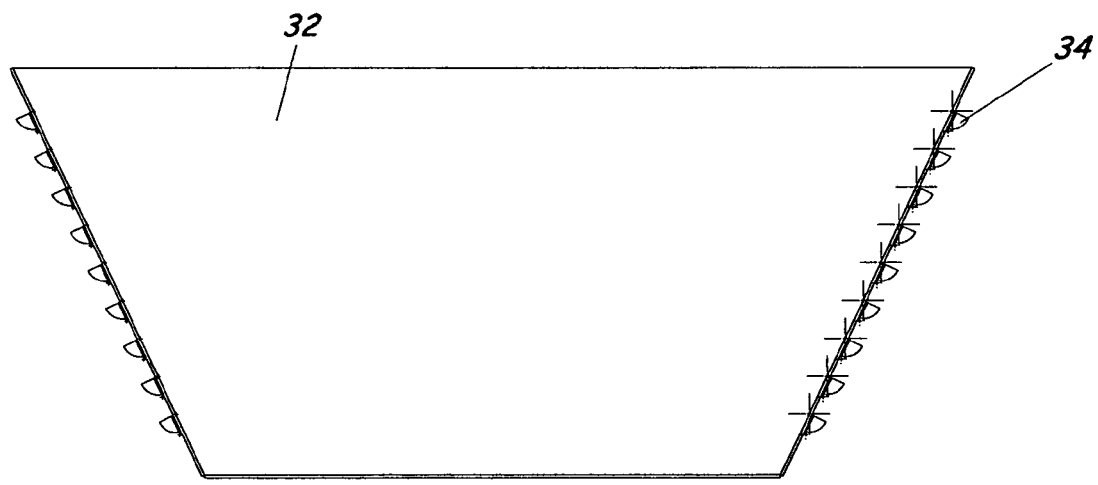
FIG. 17 is a top, planar view of a refrigeration unit cover according to an embodiment of the present invention.

Referring now to FIG. 17, a top, planar view of a refrigeration unit cover, 32, is shown. The refrigeration unit cover, 32, has louvers, 34, on each side to provide ventilation. The refrigeration unit cover, 32, is a component of the refrigeration unit system.

Figure 18:
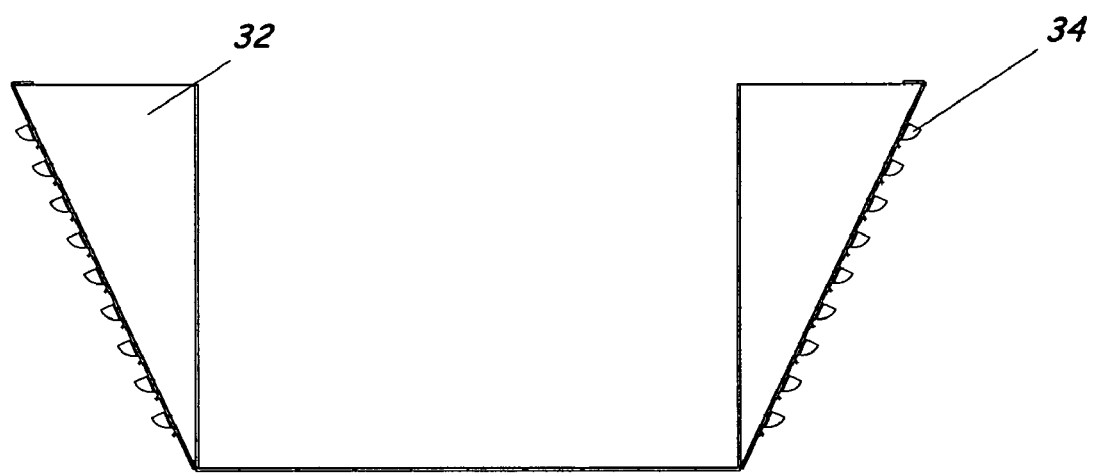
FIG. 18 is a bottom, planar view of a refrigeration unit cover according to an embodiment of the present invention.

Referring now to FIG. 18, a bottom, planar view of a refrigeration unit cover, 32, is shown. The refrigeration unit cover, 32, has louvers, 34, on each side to provide ventilation. The refrigeration unit cover, 32, is a component of the refrigeration unit system.

Figure 19:
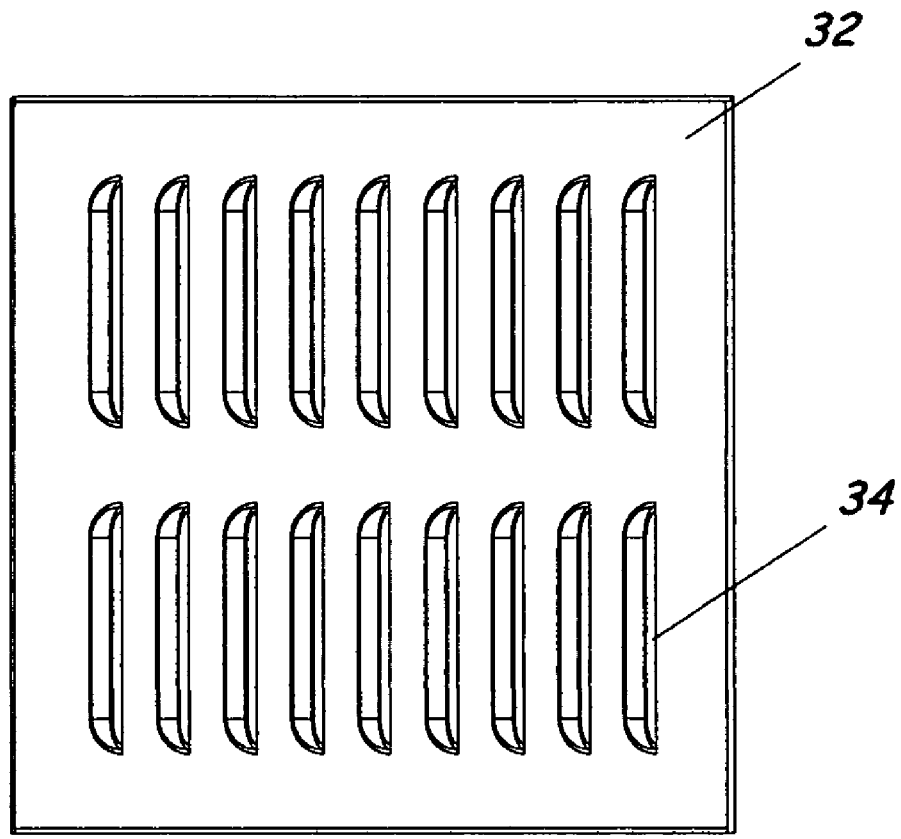
FIG. 19 is a side, planar view of a refrigeration unit cover according to an embodiment of the present invention.

Referring now to FIG. 19, a side, planar view of a refrigeration unit cover, 32, is shown. The refrigeration unit cover, 32, has louvers, 34, on each side to provide ventilation. The refrigeration unit cover, 32, is a component of the refrigeration unit system.

Figure 20:
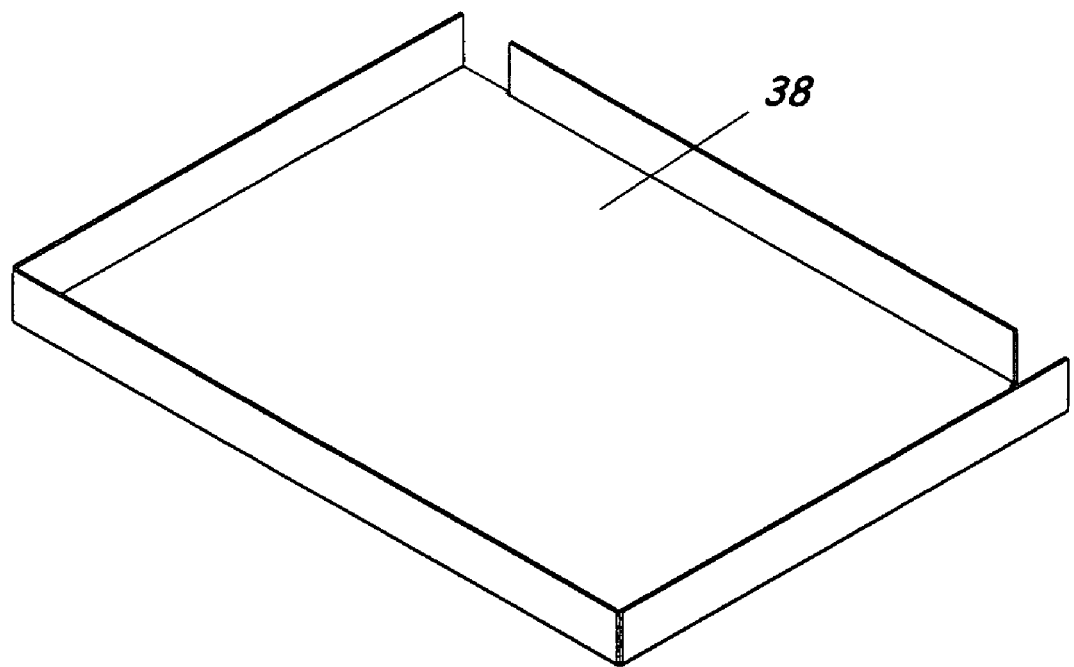
FIG. 20 is a front, perspective view of a refrigeration unit bottom according to an embodiment of the present invention.

Referring now to FIG. 20, a front, perspective view of a refrigeration unit bottom, 38, is shown. The refrigeration unit bottom, 38, is a component of the refrigeration unit system and supports the refrigeration unit.

Figure 21:
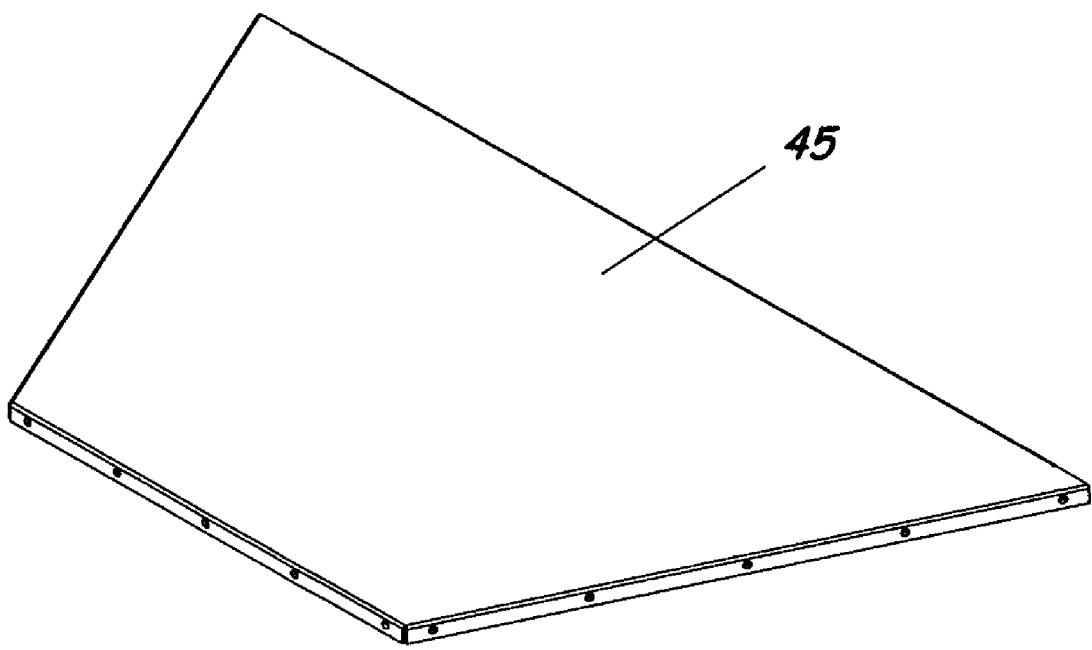
FIG. 21 is a front, perspective view of a generator housing cap according to an embodiment of the present invention.

Referring now to FIG. 21, a front, perspective view of a generator housing cap, 45, is shown. The generator housing cap, 45, is a component of the power unit system and its generator housing. The generator housing cap, 45, is mounted on top of the generator housing.

Figure 22:
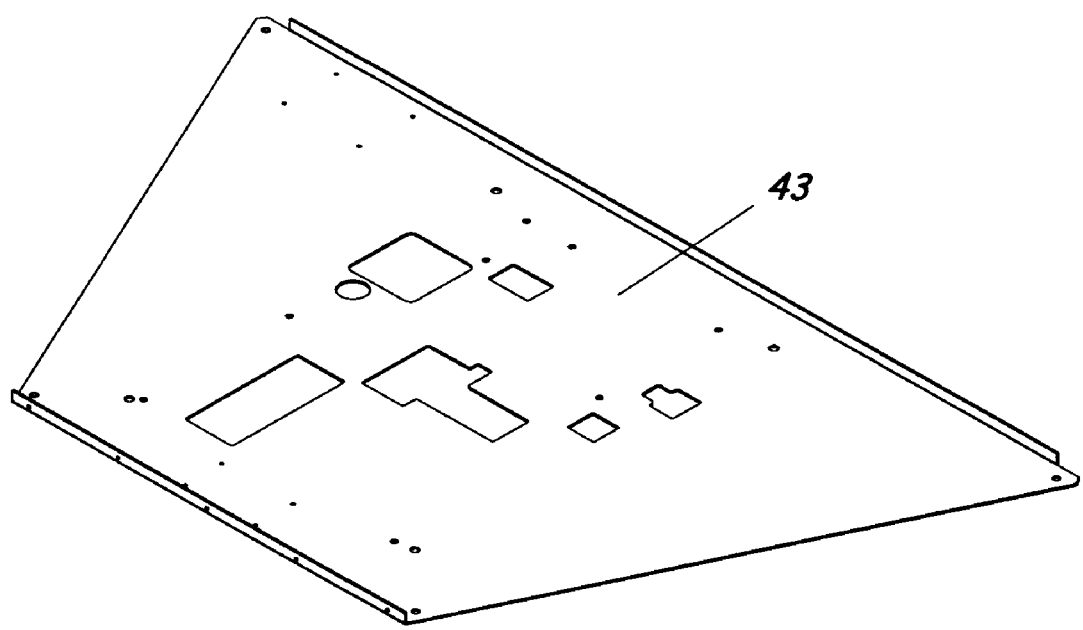
FIG. 22 is a front, perspective view of a generator housing mounting tray according to an embodiment of the present invention.

Referring now to FIG. 22, a front, perspective view of a generator housing mounting tray, 43, is shown. The generator housing mounting tray, 43, is a component of the power unit system and its generator housing.

Figure 23:
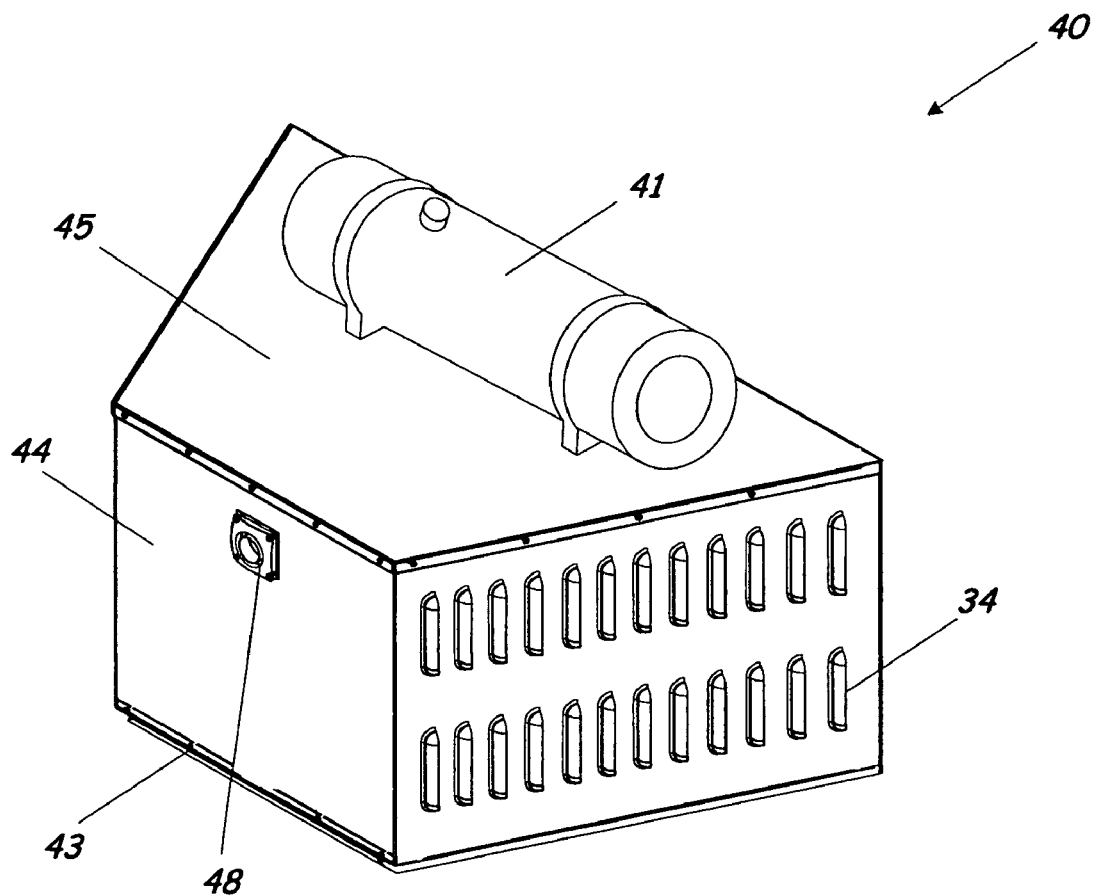
FIG. 23 is a front, perspective view of a power unit system according to an embodiment of the present invention.

Referring now to FIG. 23, a front, perspective view of a power unit system, 40, is shown. The power unit system, 40, is comprised of a gasoline powered generator, a gasoline canister, 41, a generator housing, 44, a generator housing mounting tray, 43, a generator housing cap, 45, and a receptacle for shoreline connection, 48. The generator housing, 44, has a multitude of louvers, 34, to provide ventilation.

Figure 24:
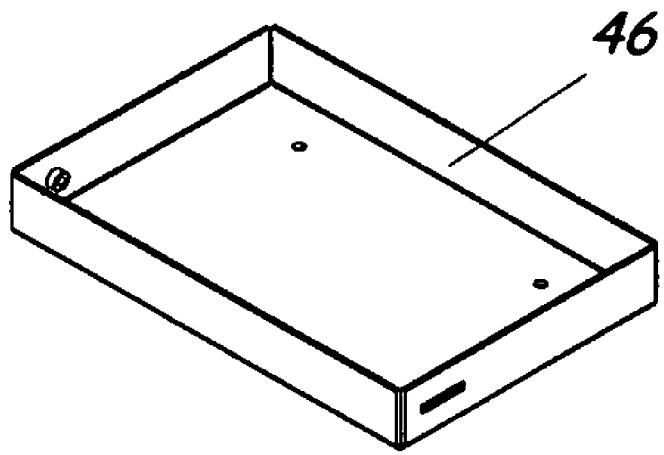
FIG. 24 is a front, perspective view of a generator housing battery box according to an embodiment of the present invention.

Referring now to FIG. 24, a front, perspective view of a generator housing battery box, 46, is shown. The generator housing battery box, 46, used in combination with the battery hold-down, secures an automobile battery within the generator housing of the power unit system.

Figure 25:
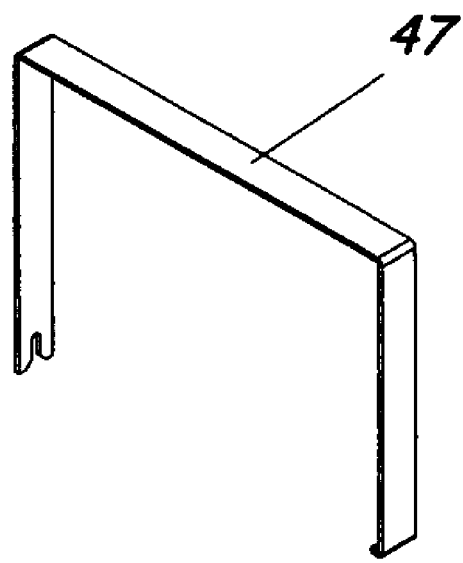
FIG. 25 is a front, perspective view of a battery hold-down according to an embodiment of the present invention.

Referring now to FIG. 25, a front, perspective view of a battery hold-down, 47, is shown. The battery hold-down, 47, is used as bracket to secure an automobile battery to the generator housing battery box located within the generator housing of the power unit system.

An embodiment of the present invention is made as follows: The self-contained mobile walk-in cooler, 10, is comprised of a cooler, 20, a refrigeration unit system, 30, a power unit system, 40, to provide power to the refrigeration unit system, 30, when a permanent power source is unavailable, and a mobile carriage system, 50, for quick and easy transport. The cooler, 20, is made of heavy duty construction. The cooler, 20, is specifically comprised of four-inch thick rigid, chlorofluorocarbon-free, urethane form-in-place modular panels: the cooler top panel, 21, the cooler door panel, the cooler front panel, 24, two cooler side panels, 23, and a cooler floor. The cooler, 20, panels are manufactured with 22-gauge embossed Galvalume® Plus skins to provide for outstanding thermal efficiency, accommodating temperatures ranging from as low as minus 40 degrees Fahrenheit to as high as 250 degrees Fahrenheit. This temperature efficiency range is aided by the fact that the Galvalume® Plus skins have an R-value, a measure of resistance to heat flow, of R-30, a high rating in terms of resistance to heat flow. One advantage of using GalValume® Plus skins is that such skins provide resistance to stains from storage and from transit corrosion. Additionally, the modular panels are comprised of tongue-and-groove panel edges, which keep the urethane insulation tightly joined together. Such edge technology ensures maximum insulating efficiency and structural integrity for the cooler. The cooler floor is comprised of a one-hundredth of an inch thick aluminum tread plate that is NSF approved. The aluminum tread plate floor surface is also easily cleaned and provides better traction and less slippage. The cooler floor will support evenly distribute loads up to 750 pounds per square foot. The cooler, 20, has a shatterproof interior for safety and efficiency. The cooler, 20, also comprises a vapor-proof light in its interior that is wired to an exterior weather-proof. The cooler, 20, can be manufactured in a variety of sizes, but three embodiments suggested are 1) a six foot width, eight foot length, and a seven and a half foot height 2) a six foot width, twelve foot length and a seven and a half foot height and 3) a six foot width, sixteen foot length, and a seven and a half foot height. The cooler, 20, size is suitable to be permanently placed on the mobile carriage system, 50, for easy transport. The refrigeration unit system, 30, is comprised of a compressor, evaporator coil, refrigerant, and a refrigeration unit cover, 32. Although the present invention may utilize various compressors and evaporator coils, a preferred embodiment includes the use of a Copeland® compressor for the refrigeration unit. A three quarter horsepower compressor is to be used on a cooler, 20, which is eight or twelve feet in length, and a one horsepower unit on a cooler, 20, that is sixteen foot in length. Additionally, the refrigeration unit, in its preferred embodiment, is comprised of a Heatcraft™ evaporator coil. For the cooler, 20, to maintain a temperature of approximately 35 degrees Fahrenheit, the refrigerant, R22, is used. Alternatively, for the cooler to maintain a temperature of approximately 0 degrees Fahrenheit, the refrigerant, R404, is used. The refrigeration unit cover, 32, is placed over the portions of the refrigeration unit that are located outside of the cooler, 20. The refrigeration unit cover, 32, has a multitude of louvers, 34, located on each side for admitting air and ensuring adequate ventilation. The power unit system, 40, is comprised of a gasoline powered generator, a gasoline canister, 41, and a generator housing, 44. The generator housing, 44, is further comprised of a generator housing mounting tray, a generator housing cap, a generator housing battery box and battery hold down, and a receptacle for shoreline connection, 48. The gasoline-powered generator may be one of many in the marketplace; however, in the preferred embodiment of this invention, a gasoline-powered Honda EV4010 generator is used. This gasoline-powered generator is a 4,000 Watt, 30 amp, 120 volt, 60 hertz, and twin-cylinder liquid cooled generator. Additionally such a generator is compact and quiet for use in the self-contained mobile walk-in cooler, 10. The gasoline canister, 41, has a capacity of 15 gallons of gasoline, providing a maximum of 22 hours of operation before the need to refuel arises. In addition to use with a gasoline-powered generator, the self-contained mobile walk-in cooler, 10, may be use with a 120 volt, 20 amp shoreline connection. Furthermore, the power unit system, 40, of the self-contained mobile walk-in cooler, 10, will automatically switch between the gasoline-powered generator and a shoreline power source. The power unit system, 40, has over-current protection. The power unit system, 40, also has a weather-proof duplex receptacle, providing two 120 volt electrical outlets for use as a receptacle for shoreline connection. The mobile carriage system, 50, by which the cooler, 20, is made mobile, is comprised of a trailer frame, 52, two trailer axles, 54, four trailer wheels, 58, and four trailer tires, 56. Although the trailer frame, 52, can be manufactured from various materials, those used in the preferred embodiment of this invention are noted. The trailer frame, 52, is constructed of five-inch steel "C" channel on the perimeter and three-inch steel "C" channel cross members. Additionally the trailer frame, 52, has a heavy-duty double-frame tongue. The two trailer axles, 54, are 5,200-pound Dexter Torflex® rubber suspension axles, providing independent wheel suspension, rubber cushioning, and shock absorption. Dexter electric brakes are used on each trailer axle, 54. The trailer tires, 56, used in the preferred embodiment of this invention are LT225/75R-15, E. The trailer wheels, 58, in the preferred embodiment of this invention are chrome 15"×7"; 6 lug ×5.5" B.C. The trailer frame, 52, of the mobile carriage system, 50, is further comprised of LED running and clearance lights for traffic safety.

An alternative embodiment of the present invention is used as follows: The self-contained mobile walk-in cooler, 10, is comprised of a cooler, 20, a refrigeration unit system, 30, a power unit system, 40, to provide power to the refrigeration unit system, 30, when a permanent power source is unavailable, and a mobile carriage system, 50, for quick and easy transport. However, in this embodiment, the self-contained mobile walk-in cooler, 10, is used in the configuration of either a freezer or a warmer. In such a configuration, the refrigeration unit system, 30, is altered such that is produces either colder or warmer air circulation throughout the body of the cooler, 20. The refrigerant used in the refrigeration unit, 31, may be changed to accommodate desired temperature ranges.

In another alternative embodiment of the present invention, the self-contained mobile walk-in cooler, 10, is used as a combination of two of the following: cooler, freezer, and warmer. This embodiment allows for alternative uses within the cooler, 20, without requiring adaptation from the manufacturer once the self-contained mobile walk-in cooler, 10, is purchased by a consumer.

What is claimed is:

1. A self-contained mobile walk-in cooler comprising:
    a cooler;
    a refrigeration unit system;
    a power unit system comprised of a gasoline-powered generator and
    a receptacle for shoreline connection, providing alternate power sources;
    a mobile carriage;
    a gasoline-powered generator;
    a gasoline canister;
    a generator housing;
    louvers on the generator housing for providing ventilation to the gasoline-powered generator;
    a generator housing mounting tray;
    a generator housing cap;
    a receptacle for shoreline connection, for use when power from a shoreline connection is available;
    a generator housing battery box; and
    a battery hold-down.

2. The self-contained mobile walk-in cooler of claim 1, wherein the cooler is further comprised of a cooler top panel, a cooler door panel, two cooler side panels, a cooler front panel, and a cooler door each being a four-inch thick rigid, chlorofluorocarbon-free, urethane form-in-place modular panel with tongue-and-groove panel edges to keep the urethane insulation tightly joined together.

3. The self-contained mobile walk-in cooler of claim 1, wherein the refrigeration unit system is further comprised of:
    a refrigeration unit;
    a refrigeration unit cover;
    louvers for providing ventilation;
    a frame, with which to mount the refrigeration unit to the cooler front panel; and
    a refrigeration unit bottom, on which to place the refrigeration unit in the frame.

4. The self-contained mobile walk-in cooler of claim 1, wherein the mobile carriage system is further comprised of:
    a trailer frame;
    two trailer axles;
    four trailer tires; and
    four trailer wheels.

5. The self-contained mobile walk-in cooler of claim 1, wherein the refrigeration unit is a three-quarter horsepower Copeland® compressor.

6. The self-contained mobile walk-in cooler of claim 1, wherein the refrigeration unit is a one horsepower Copeland® compressor.

7. The self-contained mobile walk-in cooler of claim 1, wherein the gasoline-powered generator is a gasoline-powered Honda EV4010 generator.

8. The self-contained mobile walk-in cooler of claim 1, wherein the frame is comprised of rectangular aluminum tubes and aluminum triangular plates to secure adjacent aluminum tubes for structural reinforcement.

9. The self-contained mobile walk-in cooler of claim 1, wherein the cooler is of the dimensions of a six foot width, an eight foot length, and a seven and a half foot height.

10. The self-contained mobile walk-in cooler of claim 1, wherein the cooler is of the dimensions of a six foot width, a twelve foot length, and a seven and a half foot height.

11. The self-contained mobile walk-in cooler of claim 1, wherein the cooler is of the dimensions of a six foot width, sixteen foot length, and a seven and a half foot height.

12. The self-contained mobile walk-in cooler of claim 2, wherein the cooler panels are manufactured with 22-gauge embossed Galvalume® Plus skins to provide for thermal efficiency.

13. The self-contained mobile walk-in cooler of claim 2, wherein the cooler floor is comprised of a one-hundredth of an inch thick aluminum tread plate.

14. A method for assembling a self-contained mobile walk-in cooler comprising:
    manufacturing a cooler wherein the cooler is comprised of a cooler top panel, a cooler door panel, two cooler side panels, a cooler front panel, and a cooler door each being a four-inch thick rigid, chlorofluorocarbon-free, urethane form-in-place modular panel with tongue-and-groove panel edges to keep the urethane insulation tightly joined together, mounted on a cooler floor;
    assembling a refrigeration unit system comprising a refrigeration unit, a refrigeration unit cover, a refrigeration unit bottom;
    assembling a frame with which to mount the refrigeration unit to the cooler front panel;
    mounting the refrigeration unit to the cooler front panel with the frame;
    assembling a power unit system comprising a gasoline-powered generator, a gasoline canister, a generator housing;, louvers on the generator housing for providing ventilation to the gasoline-powered generator, a generator housing mounting tray, a generator housing cap, a receptacle for shoreline connection, for use when power from a shoreline connection is available, a generator housing battery box, and a battery hold-down;
    assembling a mobile carriage system comprised of a trailer frame, two trailer axles, four trailer tires, and four trailer wheels;
    mounting the cooler securely to the mobile carriage system; and
    mounting the power unit system to the mobile carriage system.

* * * * *